United States Patent
Deboy et al.

(10) Patent No.: US 12,261,547 B2
(45) Date of Patent: Mar. 25, 2025

(54) METHOD OF OPERATING A POWER CONVERTER, CONTROL CIRCUIT, AND POWER CONVERTER WITH SWITCH INPUT CIRCUIT

(71) Applicant: Infineon Technologies Austria AG, Villach (AT)

(72) Inventors: Gerald Deboy, Klagenfurt (AT); Matthias J. Kasper, Villach (AT)

(73) Assignee: Infineon Technologies Austria AG, Villach (AT)

( * ) Notice: Subject to any disclaimer, the term of this patent is extended or adjusted under 35 U.S.C. 154(b) by 236 days.

(21) Appl. No.: 17/900,162

(22) Filed: Aug. 31, 2022

(65) Prior Publication Data

US 2023/0081602 A1 Mar. 16, 2023

(30) Foreign Application Priority Data

Sep. 13, 2021 (EP) ..................................... 21196407

(51) Int. Cl.
  *H02M 7/217* (2006.01)
  *H02M 1/42* (2007.01)
(52) U.S. Cl.
  CPC ......... *H02M 7/217* (2013.01); *H02M 1/4225* (2013.01)
(58) Field of Classification Search
  CPC ............................ H02M 7/217; H02M 1/4225
  See application file for complete search history.

(56) References Cited

U.S. PATENT DOCUMENTS

| | | | |
|---|---|---|---|
| 6,346,778 B1* | 2/2002 | Mason | H05B 47/18 315/307 |
| 2006/0103365 A1 | 5/2006 | Ben-Yaacov | |
| 2010/0181963 A1 | 7/2010 | Schreiber | |
| 2015/0131343 A1* | 5/2015 | Hufnagel | H02M 1/4225 363/49 |
| 2019/0326829 A1* | 10/2019 | Hashimoto | H02M 1/4233 |

FOREIGN PATENT DOCUMENTS

| | | | | |
|---|---|---|---|---|
| EP | 2871760 A1 | 5/2015 | | |
| WO | WO-2010079478 A1 * | 7/2010 | ............ | H02M 5/293 |
| WO | WO-2014146195 A1 * | 9/2014 | .............. | H02M 1/10 |

OTHER PUBLICATIONS

Extended European Search Report, EP 21 19 6407, Feb. 25, 2022, pp. 1-9.

* cited by examiner

*Primary Examiner* — Sisay G Tiku
(74) *Attorney, Agent, or Firm* — Armis IP Law, LLC

(57) ABSTRACT

A method for operating a power converter and a control circuit are disclosed. The method includes, in a power converter including an input, a converter stage, a first switch connected between the input and the converter stage, a second switch connected between input nodes of the converter stage, and an output capacitor connected between output nodes of the converter stage: detecting an operating state of the power converter; and operating the power converter in a first operating mode when the power converter is in a first operating state. Operating the power converter in the first operating mode includes regulating an input current received at the input by a switched-mode operation of the first and second electronic switches.

25 Claims, 11 Drawing Sheets

METHOD OF OPERATING A POWER CONVERTER, CONTROL CIRCUIT, AND POWER CONVERTER WITH SWITCH INPUT CIRCUIT

RELATED APPLICATION

This application claims priority to earlier filed European Patent Application Serial Number EP21196407 entitled "METHOD OF OPERATING A POWER CONVERTER, CONTROL CIRCUIT, AND POWER CONVERTER," filed on Sep. 13, 2021, the entire teachings of which are incorporated herein by this reference.

This disclosure relates in general to a method of operating a power converter, a corresponding control circuit, and a power converter.

BACKGROUND

Various types of power converters are widely used in different types of electronic applications. AC-DC converters, for example, are configured to receive an AC voltage from a power source, such as a power grid, and are configured to provide a DC voltage to a load. Usually, this type of converter includes an output capacitor across the DC output voltage. Before startup of the power converter, the output capacitor is not charged, so that the output capacitor is charged during startup, wherein it is desirable to avoid high inrush currents.

BRIEF DESCRIPTION

There is a need to charge the output capacitor of a power converter, such as an AC-DC converter, in an efficient way and avoiding high inrush currents.

One example relates to a method. The method includes, in a power converter including an input, a converter stage, a first switch connected between the input and the converter stage, a second switch connected between input nodes of the converter stage, and an output capacitor connected between output nodes of the converter stage, detecting an operating state of the power converter; and operating the power converter in a first operating mode when the power converter is in a first operating state. Operating the power converter in the first operating mode includes regulating an input current received at the input by a switched-mode operation of the first and second electronic switches.

Another example relates to a control circuit configured to detect an operating state of a power converter, and operate the power converter in a first operating mode when the power converter is in a first operating state. The power converter includes an input, a converter stage, a first switch connected between the input and the converter stage, a second switch connected between input nodes of the converter stage, and an output capacitor connected between output nodes of the converter stage. Operating the power converter in the first operating mode includes regulating an input current received at the input by a switched-mode operation of the first and second electronic switches.

Further embodiments herein include an apparatus comprising: a controller operative to control operation of a first switch and a second switch in accordance with a switched-mode operation of alternatingly switching ON and switching OFF the first switch and the second switch; wherein the first switch is disposed between an input node of the apparatus and a first node of a converter stage; and wherein the second switch is disposed between the first node and a second node of the converter stage, the input node operative to supply an input current to the first switch, an output node of the apparatus operative to output an output voltage produced by the converter stage.

In still further example embodiments, the controller is further operative to: in accordance with the switched-mode operation of alternatingly switching ON and switching OFF the first switch and the second switch: i) in a first mode, control the first switch to an ON-state and the second switch to an OFF-state; and ii) in a second mode, control the first to an OFF-state and the second switch to an ON-state. The first switch may be disposed in series with the second switch.

It is to be understood that the system, method, device, apparatus, logic, etc., as discussed herein can be embodied strictly as hardware (such as analog circuitry, digital circuitry, logic, etc.), as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of implementations herein purposefully does not specify every implementation and/or incrementally novel aspect of the present disclosure or claimed invention(s). Instead, this brief description only presents general implementations and corresponding points of novelty over conventional techniques. For additional details and/or possible perspectives (permutations) of the invention(s), the reader is directed to the Detailed Description section and corresponding figures of the present disclosure as further discussed below.

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

Figure 1:
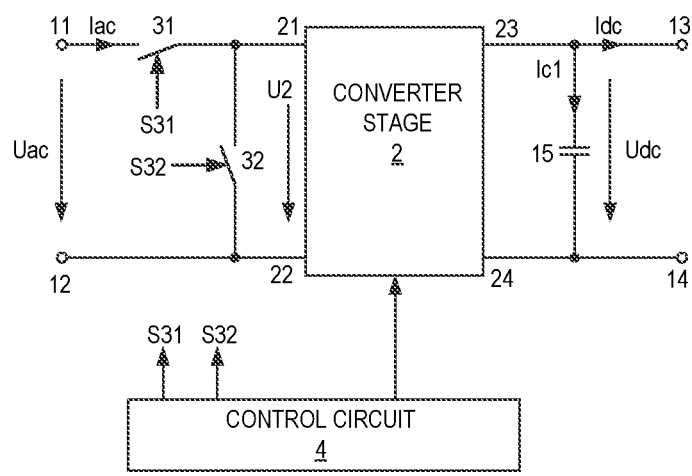
FIG. 1 illustrates a circuit diagram of a power converter that includes a first switch, a second switch and a converter stage.

FIG. 1 illustrates a circuit diagram of a power converter according to one example. Referring to FIG. 1, the power converter includes an input 11, 12, a converter stage 2, a first electronic switch 31, a second electronic switch 32, and an output capacitor 15. The first switch 31 is connected between the input 11, 12 of the power converter and the converter stage 2, the second switch is 32 connected between input nodes 21, 22 of the converter stage 2, and the output capacitor 15 is connected between output nodes 23, 24 of the converter stage 2.

In the power converter according to FIG. 1, "the first switch 31 being connected between the input 11, 12 of the power converter and the converter stage 2" includes that the first switch 31 is connected between a first input node 11 of the input 11, 12 and a first one 21 of the input nodes 21, 21 of the converter stage 2. This, however, is only an example. According to another example (not shown), the first switch 31 is connected between a second input node 12 of the input 11, 12 and a second one 22 of the input nodes 21, 22 of the converter stage 2.

The input 11, 12 of the power converter includes a first input node 11 and a second input node 12 and is configured to receive an input voltage Uac and an input current Iac from a power source (not shown). According to one example, the input voltage Uac is an alternating voltage, such as an 110 Vrms or 230 Vrms sinusoidal voltage with a frequency of 50 Hz or 60 Hz, and the power source is a power grid.

The power converter is configured to generate an output voltage Udc based on the input voltage Uac. The output voltage Udc is provided at an output 13, 14 of the power converter and across the output capacitor 15. The output 13, 14 of the power converter is connected to the output nodes 23, 24 of the converter stage 2, wherein, according to one example, the output 13, 14 of the power converter is formed by the output nodes 23, 24 of the converter stage 2.

Referring to FIG. 1, the power converter further includes a control circuit 4 that is configured to control operation of the converter stage 2 and the first and second switches 31, 32. According to one example, the converter stage 2 has a circuit topology, such as a boost converter topology, that allows a current flow from the input nodes 21, 22 to the output nodes 23, 24 and the output capacitor 15 whenever a voltage level of an input voltage U2 received at the input nodes 21, 22 of the converter stage 2 is higher than the output voltage Udc across the output capacitor 15. Such current flow, when the input voltage U2 is higher than the output voltage Udc, cannot be interrupted or regulated by suitably controlling operation of the converter stage 2 by the control circuit 4. Thus, directly connecting the converter stage 2 to the input 11, 12 of the power converter could cause high inrush currents during startup. In the following, "startup" denotes an operating state of the power converter in which the output voltage Udc across the output capacitor 15 is lower than an amplitude (peak voltage) of the input voltage Uac.

According to one example, each of the first and second electronic switches 31, 32 is implemented as a bidirectionally blocking switch. A "bidirectionally blocking switch" is an electronic switch that can be operated in a blocking state independent of a polarity of a voltage applied across the switch. According to one example, the bidirectionally blocking switch includes two unidirectionally blocking switches connected in series. An "unidirectionally blocking switch" is an electronic switch that, in an off-state, is configured to block when the voltage across the switch has a first polarity and is configured to conduct when the voltage has a second polarity opposite the first polarity.

According to one example, the unidirectionally blocking switches connected in series are MOSFETs. A MOSFET includes an internal body diode, so that the MOSFET, in the off-state, is configured to block when the voltage across a load path (drain-source path) of the MOSFET reverse biases the body diode and is configured to conduct when the voltage across the load path forward biases the body diode. The off-state is an operating state in which the MOSFET receives a drive voltage (gate-source voltage) that interrupts an internal channel in a body region along a gate dielectric of the MOSFET. This is commonly known so that no further explanation is required in this regard.

In a bidirectionally blocking electronic switch that includes two MOSFETs the MOSFETs are connected in series such that the body diodes of the two MOSFETs are connected in anti-series, that is, in a back-to-back configuration. If both MOSFETs are either n-type MOSFETs or p-type MOSFETs connecting the body diodes in a back-to-back configuration may be achieved by connecting the source node of one of the two MOSFETs to the source node of the other one of the two MOSFETs or by connecting the drain node of one of the two MOSFETs to the drain node of the other one of the two MOSFETs. If one of the MOSFETs is an n-type MOSFET and the other one of the two MOSFETs is a p-type MOSFET connecting the body diodes in a back-to-back configuration may be achieved by connecting the source node of any one of the two MOSFETs to the drain node of the other one of the two MOSFETs. The MOSFETs can be implemented as enhancement MOSFETs or as depletion MOSFETs.

Figure 2A:
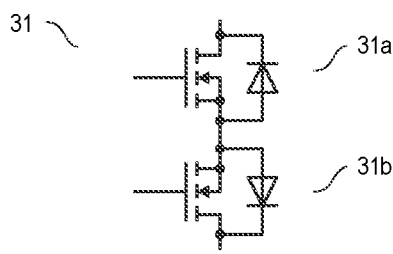
FIGS. 2A-2B illustrate examples for implementing the first and second switches according to FIG. 1.
Figure 2B:
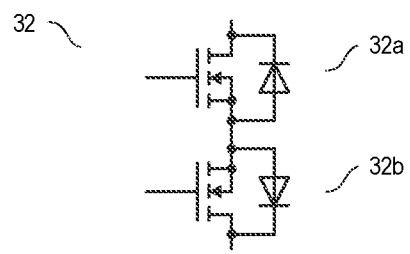

FIGS. 2A and 2B illustrate examples of the first and second electronic switches 31, 32 that are each implemented as a bidirectionally blocking electronic switch. Each of the first and second electronic switches 31, 32 includes a first MOSFET 31a, 31b and a second MOSFET 32a, 32b connected in series such that the respective internal body diodes (which are represented by the diode symbols in FIGS. 2A and 2B) are in a back-to-back configuration. In the examples shown in FIGS. 2A and 2B each of the first and second MOSFETs 31a, 31b, 32a, 32b is an n-type MOSFET and the source nodes are connected, so that the body diodes in a back-to-back configuration. The MOSFETs 31a, 31b, 32a, 32b are enhancement MOSFETs in the examples shown in FIGS. 2A, 2B.

Implementing the first and second electronic switches 31, 32 as bidirectionally blocking switches using two MOSFETs connected in series is only an example. Any other kind of bidirectionally blocking switch may be used as well.

Another example of a bidirectionally blocking switch includes a GaN (gallium nitride) HEMT that includes two gate electrodes.

In both a bidirectionally blocking switch that includes two MOSFETs connected in anti-series and a HEMT with two gate electrodes, a freewheeling functionality can be achieved. The freewheeling functionality includes that the switch blocks when a voltage across the switch has a first polarity and conducts when the polarity of the voltage changes. The freewheeling functionality can be achieved by switching off only one of the MOSFETs or by deactivating only one of the two gates of the HEMT at the same time and by switching on the other one of the two MOSFETs or by activating the other one of the two gates of the HEMTs. The MOSFET that is switched off is selected such that it blocks when the voltage has the first polarity and conducts (via the body diode) when voltage has the second polarity. Equivalently, in a HEMT, the deactivated gate is selected such that it causes the HEMT to block when the voltage has the first polarity and to conduct when voltage has the second polarity.

Figure 3:
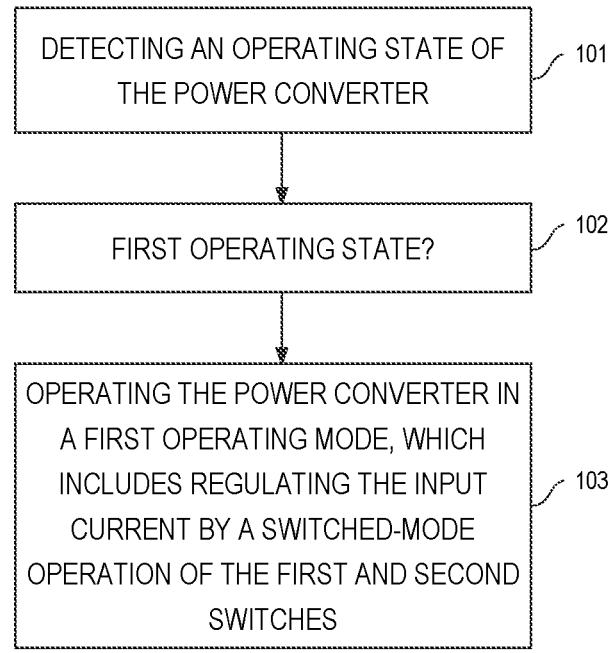
FIG. 3 illustrates one example of a method for operating a power converter of the type shown in FIG. 1.

In the power converter according to FIG. 1 that includes the first and second switches 31, 32 in addition to the converter stage 2, the first and second switches 31, 32, controlled by the control circuit 4, are configured to protect the power converter against high inrush currents during startup. FIG. 3 illustrates one example of a method that is configured to charge the output capacitor 15 during startup and, at the same time, protects the power converter against high inrush currents.

Referring to FIG. 3, the method includes detecting an operating state of the power converter (101), detecting whether the operating state is a first operating state (102), and operating the power converter in a first operating mode, if the power converter is in the first operating state. Operating the power converter in the first operating mode includes regulating the input current Iac by a switched-mode operation of the first and second electronic switches 31, 32 (103).

According to one example, the "switched-mode operation" of the first and second electronic switches 31, 32 includes alternatingly switching on and switching off the first and second electronic switches 31, 32 such that in each of a plurality of successive drive cycles each of the first and second electronic switches 31, 32 is switched on for a respective on-time and such that the two switches 31, 32 are not switched on at the same time instance. Operating the first and second electronic switches 31, 32 in this way is illustrated in FIG. 4.

Figure 4:
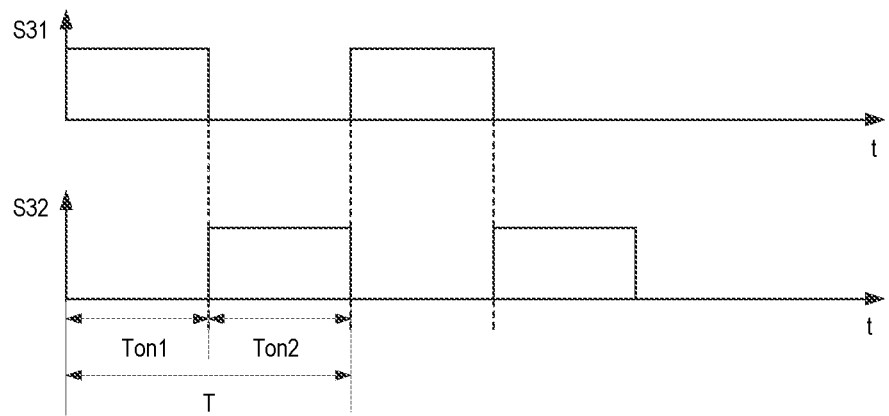
FIG. 4 shows signal diagrams that illustrate a switched-mode operation of the first and second switches in successive drive cycles.

FIG. 4 shows signal diagrams of drive signals S31, S32 received by the first and second electronic switches 31, 32 in several successive drive periods. Each of the drive signals S31, S32 can have an on-level and an off-level, wherein the on-level switches on the respective electronic switch S31, S32 and the off-level switches off the respective electronic switch S31, S32. Just for the purpose of illustration, the on-level is a high signal level and the off-level is a low signal level in the example shown in FIG. 4.

In FIG. 4, T denotes the duration of one drive cycle, Ton1 denotes an on-time of the first electronic switch 31, and Ton2 denotes an on-time of the second electronic switch 32. A switching frequency fsw is given by a reciprocal of the duration T of one drive cycle, $$fsw = \frac{1}{T}. \qquad (1)$$

According to one example, the switching frequency is fixed. The switching frequency fsw is much higher than the frequency of the input voltage Uac. According to one example, the switching frequency fsw is selected from between 10 kHz and 200 kHz. However, a fixed switching frequency, that is, a fixed duration T of the drive cycles, is only an example. It is also possible to operate the first and second switches 31, 32 in a switched-mode such that the duration T of the drive cycles varies.

According to one example, regulating the input current Iac includes regulating a duty cycle d3 of the first electronic switch 31, wherein the duty cycle d3 is given by the on-time of the first electronic switch 31 divided by the duration T of the drive cycle, $$d3 = \frac{Ton1}{T}. \qquad (2)$$

Regulating the duty cycle of the first electronic switch 31 is explained in detail herein further below.

The operating state of the power converter is defined by two or more operating parameters of the power converter. Operating parameters of the power converter include, for example, the input voltage Uac and the output voltage Udc. According to one example, the power converter is in the first operating state, so that the control circuit 4 operates the power converter in the first operating mode, when the input voltage Uac meets a first condition. According to one example, the input voltage Uac meets the first condition when a magnitude of the input voltage Uac is equal to or higher than the voltage level of the output voltage Udc, $$|Uac| \geq Udc \qquad (3)$$

According to one example, the input voltage Uac meets the first condition when the magnitude of the input voltage Uac exceeds the voltage level of the output voltage for more than a predefined threshold. According to one example, the threshold is selected from between 0.5V and 2V.

Figure 5:
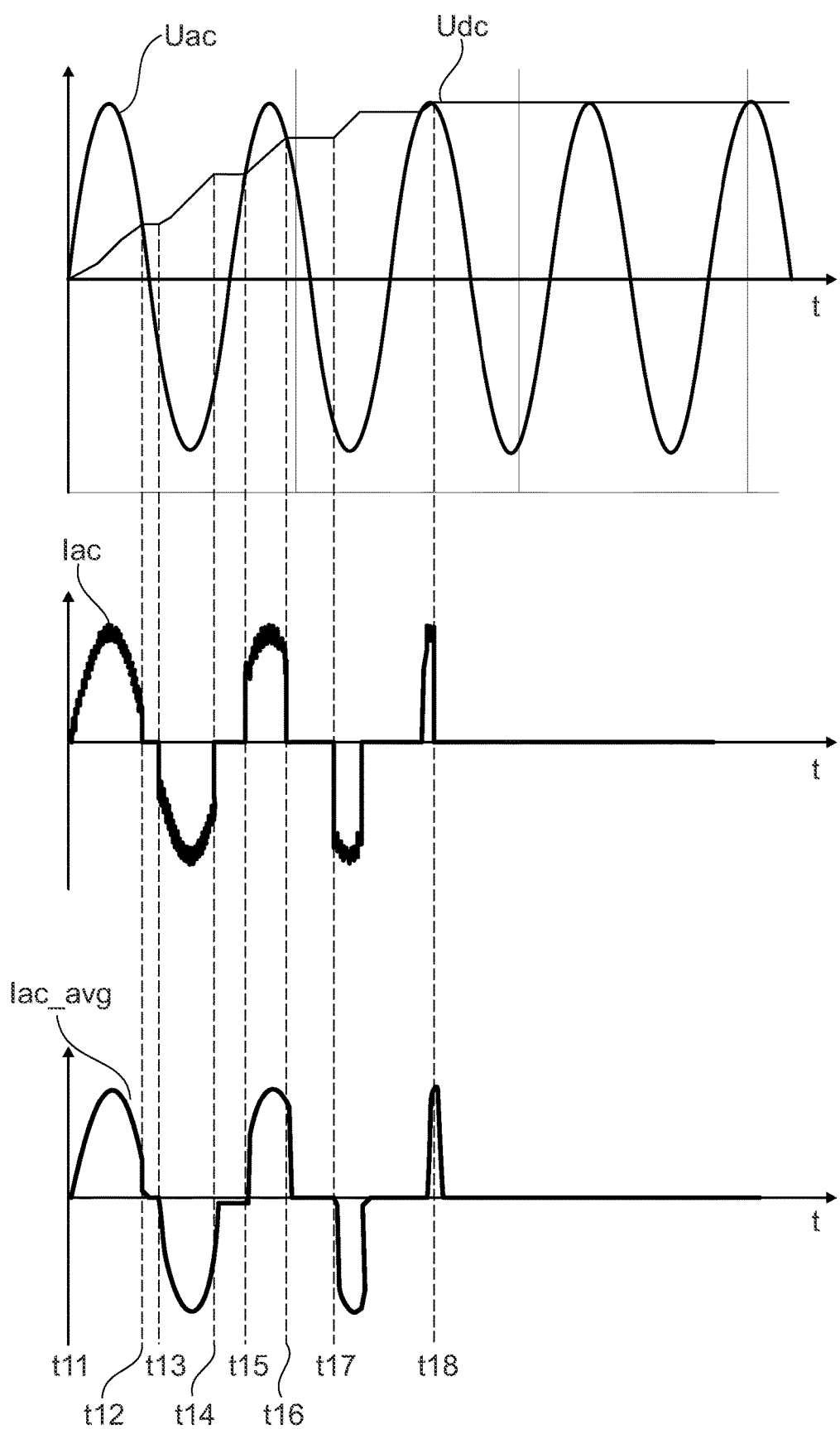
FIG. 5 shows signal diagrams that illustrate operating the power converter in accordance with the method according to FIG. 3.

FIG. 5 shows signal diagrams that illustrate operating the power converter in accordance with the method according to FIG. 3 during startup. More specifically, FIG. 5 shows signal diagrams of the input voltage Uac, the output voltage Udc, the input current Iac; and an average input current Iac_avg. The startup phase illustrated in FIG. 5 starts at a first time instance t11, wherein at the first time instance t11 the output capacitor 15 is not charged, so that the output voltage Udc is zero. The input voltage Uac is a sinusoidal voltage in this example.

Just for the purpose of illustration it is assumed that the power converter is in the first operating state when the magnitude of the input voltage Uac is higher than the voltage level of the output voltage Udc. Furthermore, it is assumed that during startup the output current Idc is zero so that the input current Iac only charges the output capacitor 15.

Referring to FIG. 5, the input voltage Uac alternatingly includes positive and negative halfwaves. During each of these positive and negative halfwaves, until the voltage level of the output voltage Udc reaches the amplitude (peak) of the input voltage Uac, there is a time period in which the magnitude of the input voltage Uac is higher than the voltage level of the output voltage Udc, so that the output capacitor is charged due to the switched-mode operation of the first and second electronic switches 31, 32. These time periods may be referred to as charging periods. In the example according to FIG. 5, charging periods are time periods between the first time instance t11 and a second time instance t12, between a third time instance t13 and a fourth time instance t14, between a fifth time instance t15 and a sixth time instance t16, and so on. At a further time instance t18, the voltage level of the output voltage Udc reaches the amplitude of the input voltage Uac so that, during startup, charging of the output capacitor 15 stops. Due to the charging of the output capacitor 15 during the charging periods, the output voltage Udc increases so that the duration of the charging periods decreases over the startup phase.

According to one example, operating the power converter in the first operating mode includes deactivating the converter stage 2, so that a current flow through the converter stage is only governed by the switched-mode operation of the first and second electronic switches 31, 32. Deactivating the converter stage 2 may include (a) switching off each of one or more switches included in the converter stage, or (b) switching on only one or more switches that include a freewheeling element and that have the respective freewheeling element forward biased by the switched-mode operation of the first and second electronic switches. Option (b) may help to reduce conduction losses.

According to one example, operating the power converter in the first operating mode includes operating the power converter in a PFC (Power Factor Correction) mode, which is an operating mode in which a current level of the input current Iac is dependent on a voltage level of the input voltage Uac and, in particular, in which an average input current Iac is proportional to the input voltage Uac, wherein the "average" includes the average over a respective drive cycle of the switched-mode operation of the first and second switches 31, 32.

Referring to the above, in the first operating mode, the voltage level of the input voltage Uac is lower than the voltage level of the output voltage Udc, so that, in the first operating mode, the power converter operates in a buck mode. Thus, the duty-cycle d3, which governs the switched-mode operation of the first and second electronic switches 31, 32, may also be referred to as buck mode duty-cycle.

In the example illustrated in FIG. 5, the power converter, during the charging periods, is operated in the PFC mode so that the average input current Iac_avg is proportional to the input voltage Uac. The "average input current Iac_avg" is the average of the input current during one or more drive cycles of the switched-mode operation of the first and second switches 31, 32. Due to the switched-mode operation of the first and second switches 31, 32 the instantaneous current level of the input current Iac ripples (oscillates) around the average input current value Iac_avg, wherein a magnitude of the input current may increase during the on-times of the first switch 31 and decrease during the off-times of the first switch 31.

An operating state in which the input voltage Uac does not meet the first condition and the voltage level of the output voltage Udc is lower than the amplitude of the input voltage Uac may be referred to as second operating state. In the example shown in FIG. 5, the power converter is in the second operating state when the magnitude of the input voltage Uac is lower than the voltage level of the output voltage Udc and when the voltage level of the output voltage Udc is lower than the amplitude of the input voltage Uac.

According to one example, the method includes operating the power converter in a second operating mode when the power converter is in the second operating state. According to one example, operating the power converter in the second operating mode includes deactivating the converter stage 2, permanently switching off the first switch 31 and permanently switching on the second switch 32, so that the input current Iac is zero in the second operating mode. In the example shown in FIG. 5, the power converter is in the second operating mode in time periods that are between the charging periods.

Figure 6:
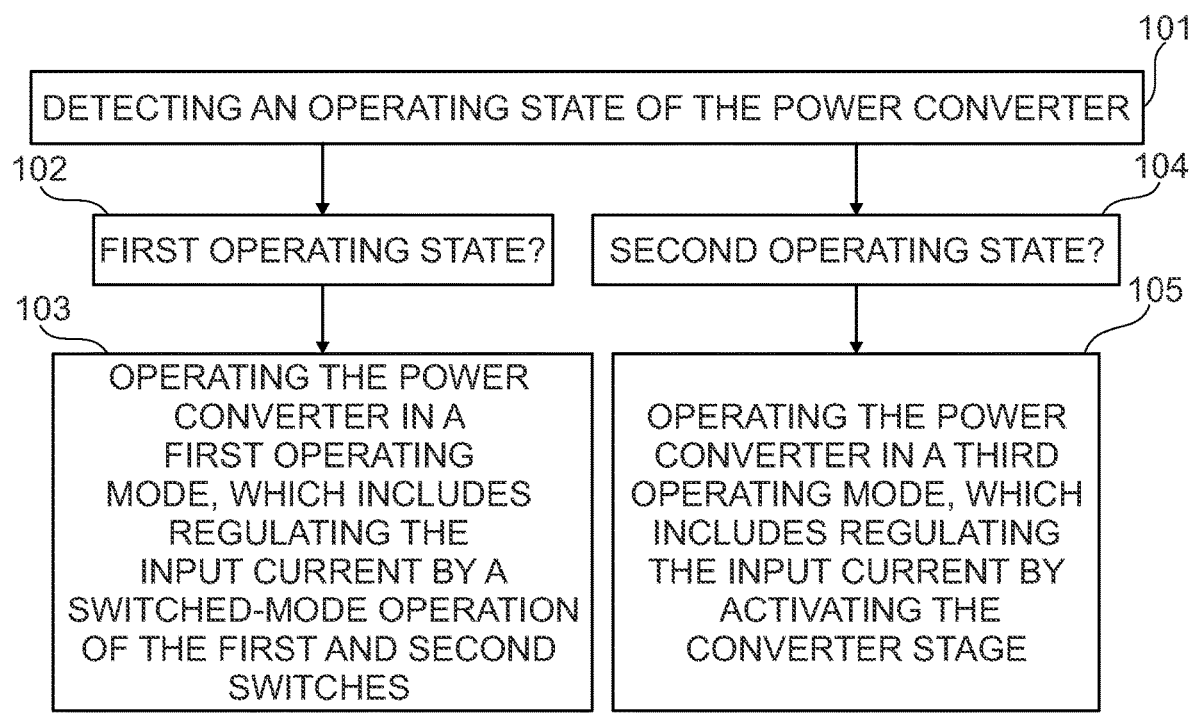
FIG. 6 illustrates another example of a method for operating a power converter of the type shown in FIG. 1.

FIG. 6 illustrates a further example of a method for operating the power converter. The method illustrated in FIG. 6 is based on the method according to FIG. 3 and is different from the method according to FIG. 3 by additionally detecting whether the power converter is in the second operating state (104), and operating the power converter in a third operating mode when the power converter is in the second operating state (105), wherein operating the power converter in the third operating mode includes regulating the input current Iac by activating the converter stage 2.

According to one example, activating the converter stage 2 includes operating the converter stage 2 in a PFC mode, so that a current level of the input current Iac is dependent on a voltage level of the input voltage Uac and, in particular, is proportional to the input voltage Uac. According to one example, operating the power converter in the third operating mode further includes permanently switching on the first switch 31 and permanently switching off the second switch 32. Permanently switching off the second switch 32 in this operating mode includes operating the second switch 32 such that it blocks irrespective of a polarity of the voltage across the second switch. In the third operating mode, the converter stage 2 operates as a boost converter and the power converter operates in a boost mode.

Figure 7:
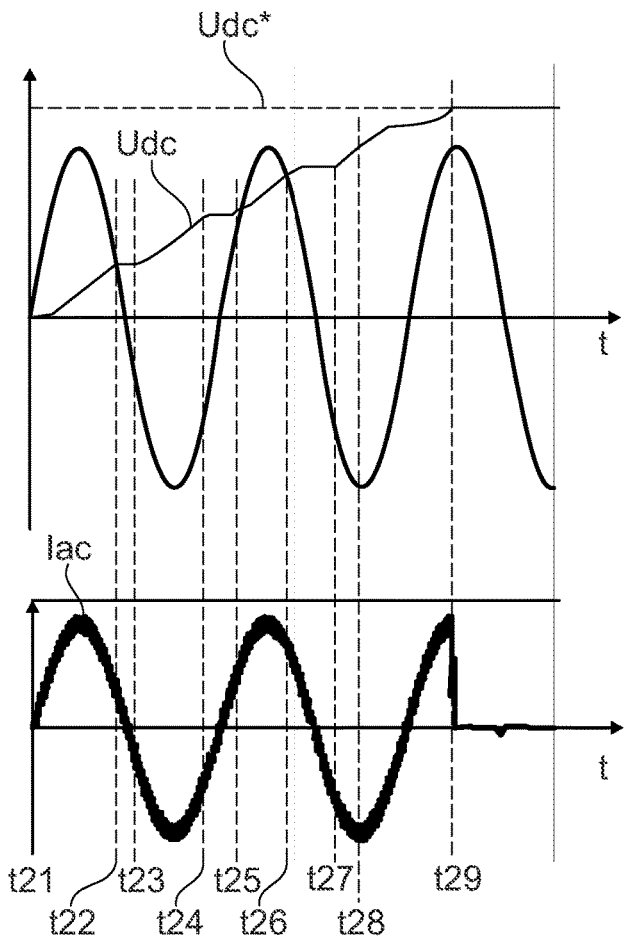
FIG. 7 shows signal diagrams that illustrate operating the power converter in accordance with the method according to FIG. 3.

FIG. 7 shows signal diagrams that illustrate operating the power converter in accordance with the method according to FIG. 6. More specifically, FIG. 7 shows signal diagrams of the input voltage Uac, the output voltage Udc and the input current Iac. For the purpose of illustration it is assumed that the power converter is in the first operating state when the magnitude of the input voltage Uac is higher than the voltage level of the output voltage Udc and is in the second operating state when the magnitude of the input voltage Uac is lower than the voltage level of the output voltage Udc and the voltage level of the output voltage Udc is lower than an amplitude of the input voltage Uac.

In the example shown in FIG. 7, the power converter is in the first operating state between a first time instance t21 and a second time instance t22, between a third time instance t23 and a fourth time instance t24 and between a fifth time instance t25 and a sixth time instance t26, and between a seventh time instance t27 and an eighth time instance t28. As the output capacitor 15 is charged over the startup phase, the duration of the time periods in which the power converter is in the first operating state decreases over the time. In the method according to FIG. 7, time periods in which the power converter is in the second operating state are between the second time instance t22 and the third time instance t23, between the fourth time instance t24 and the fifth time instance t25, between the sixth time instance t26 and the seventh time instance t27 and after the eighth time instance t28.

In the example shown in FIG. 7, the converter stage, in the third operating mode, is operated such that charging the output capacitor 15 stops when the output voltage Udc has reached an output voltage reference Udc*. In the example shown in FIG. 7, the output voltage Udc reaches the output voltage reference Udc* at a further time instance t29, so that the input current Iac decreases to zero at this time instance t29.

In the method according to FIG. 7, the input current Iac is dependent on the input voltage Uac throughout the startup phase. In particular, an average of the input current Iac is proportional to the input voltage Uac. That is, the power converter is operated in a PFC mode in both the first operating mode and the third operating mode.

Figure 8:
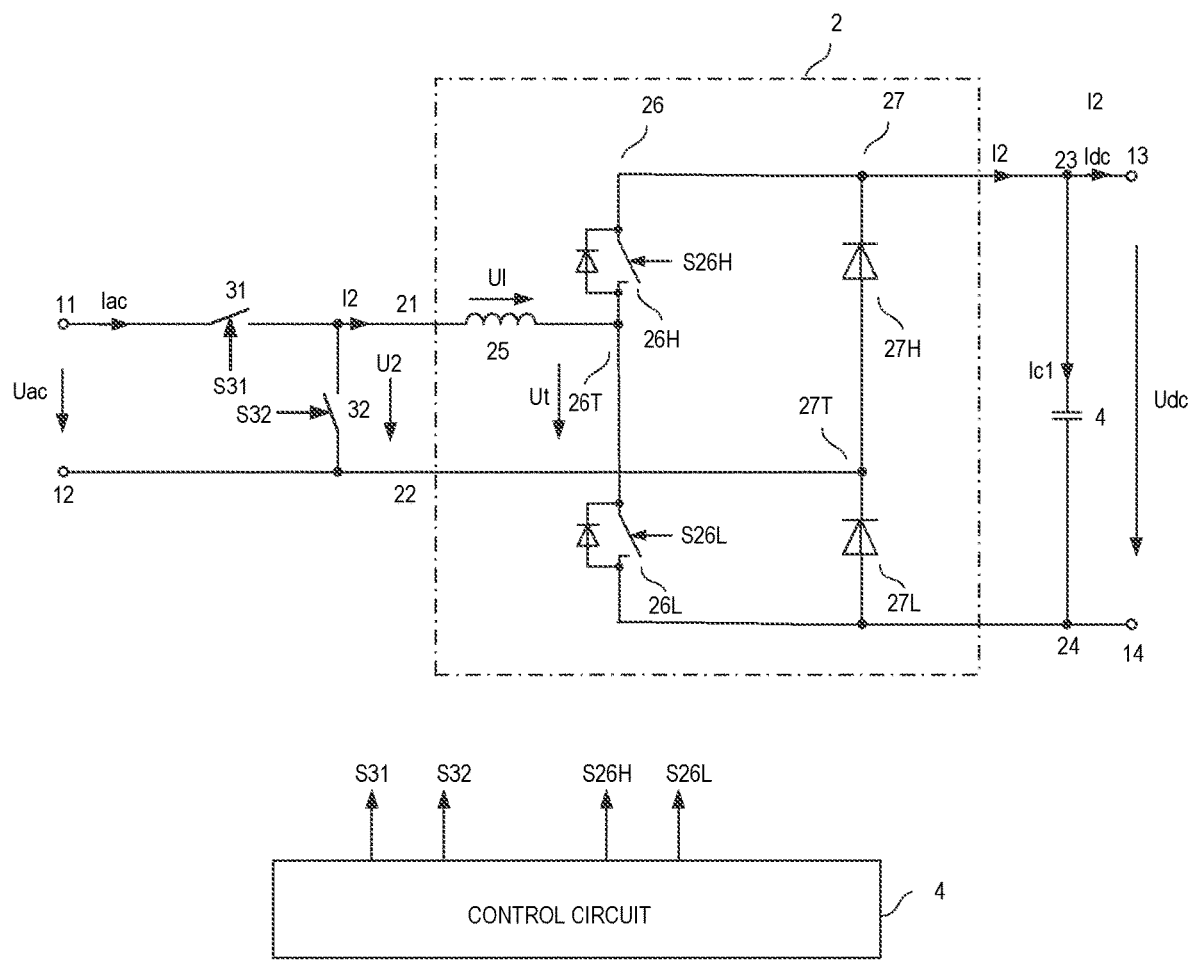
FIG. 8 illustrates one example of a converter stage having a Totem pole topology.

FIG. 8 illustrates one example of the converter stage 2 in greater detail. In the example shown in FIG. 2, the converter stage 2 includes a Totem pole dual boost PFC rectifier topology or, in short, Totem pole topology, which is one example of a boost converter topology. The converter stage 2 includes an inductor 25 that is connected between the input 21, 22 of the converter stage 2 and a tap 26T of a first half-bridge 26. More specifically, the inductor 25 is connected between one of the input nodes 21, 22 and the tap 26T. In the example shown in FIG. 8, the inductor 25 is connected between the first input node 21 and the tap 26T. This, however, is only an example. According to another example (not illustrated), the inductor 25 is connected between the second input node 22 and the tap 27T.

The first half-bridge 26 includes a first switch 26H, which is also referred to as high-side switch in the following, and a second switch 26L, which is also referred to as low-side switch in the following. The high-side switch 26H and the low-side switch 26L are connected in series between the output nodes 23, 24 of the converter stage 2 and are connected with one another at the tap 26T.

According to one example, each of the high-side switch 26H and the low-side switch 26L includes a freewheeling element that is configured to conduct when a voltage across the respective switch 26H, 26L has a certain polarity. The freewheeling element is represented by a diode in the example shown in FIG. 8. The high-side switch 26H and the low-side switch 26L may be implemented as a MOSFET, so that the freewheeling element may be formed by the body diode of the respective MOSFET. This, however, is only an example. Any other type of electronic switch with an internal freewheeling element or any other type of electronic switch having an external freewheeling element connected in parallel thereto may be used as well.

Referring to FIG. 8, the high-side switch 26H and the low-side switch 26L may be connected between the tap 26T and the first and second output nodes 23, 24 such that the freewheeling element of the high-side switch 26H conducts when an electrical potential at the tap 26T is higher than the electrical potential at the first output node 23 and such that the freewheeling element of the low-side switch 26L conducts when the electrical potential at the tap 26T is lower than the electrical potential at the second output node 24.

Referring to FIG. 8, the converter stage 2 further includes a second half-bridge 27 that is connected between the first and second output nodes 23, 24 and includes a tap 27T that is connected to the input. In the example illustrated in FIG. 8, the tap 27T is connected to the second input node 22.

The second half-bridge 27 includes two freewheeling elements connected in series between the first and second output nodes 23, 24 and connected with each other at the tap 27T. A first freewheeling element 27H is connected between the tap 27T and the first output node 23 and is also referred to as high-side freewheeling element in the following, and a second freewheeling element 27L is connected between the second output node 24 and the tap 27T and is also referred to as low-side freewheeling element in the following. Just for the purpose of illustration, the freewheeling elements 27H, 27L are pn diodes in the example shown in FIG. 8. However, these freewheeling elements may be implemented as Schottky diodes as well. According to another example, in order to reduce conduction losses, an electronic switch (not shown in FIG. 8) is connected in parallel with each of the high-side element 27H and the low-side freewheeling element 27L and is switched on by a respective drive circuit whenever the respective freewheeling element is forward biased. Implementing a converter stage with a totem pole topology in this way is commonly known, so that no further explanation is required in this regard.

According to one example, the high-side freewheeling element 27H is connected between the tap 27T of the second half-bridge 27 and the first output node 23 in such a way that the high-side freewheeling element 27H conducts when the electrical potential at the tap 27T is higher than the electrical potential at the first output node 23, and the low-side freewheeling element 27L is connected between the second output node 24 and the tap 27T such that the low-side freewheeling element 27L conducts when the electrical potential at the second output node 24 is higher than the electrical potential at the tap 27T.

Referring to the above, in a converter stage 2 having a boost converter topology there is always a conducting path between the input 21, 22 and the output 23, 24 when the converter stage input voltage U2 is higher than the output voltage Udc. When, for example, the converter stage input voltage U2 is positive and has a magnitude that is higher than the voltage level of the output voltage Udc, an input current I2 received by the converter stage 2 may flow via the inductor 25, the freewheeling element of the high-side side switch 26H, the output capacitor 15 and the low-side freewheeling element 27L. When the converter stage input voltage U2 is negative and has a magnitude that is higher than the voltage level of the output voltage Udc, the (negative) input current I2 may flow via the high-side freewheeling element 27H, the output capacitor 15, the freewheeling element of the low-side switch 26L and the inductor 25.

The converter stage 2 is in a deactivated state when either both the high-side switch 26H and the low-side switch 26L are in an off-state (switched-off state) or when only that one of the high-side switch 26H and the low-side switch 26L is switched on that has the respective freewheeling element forward biased. In the deactivated state of the converter stage 2, the first and second switch 31, 32 and the converter stage 2 form a buck converter, so that by suitably controlling the switched-mode operation of the first switch 31 and the second switch 32, the input current Iac of the power converter can be regulated in those time periods in which the magnitude of the input voltage Uac is higher than the voltage level of the output voltage Udc. In each case, the first switch 31 acts as a control switch, wherein by adjusting the duty-cycle of the switched-mode operation of the first switch 31, the input current Iac can be adjusted when the power converter is in the first operating mode. The second switch 32 acts as an active freewheeling element which allows the current through the inductor 25 to continue to flow when the first switch 31 switches off.

In order to avoid a short circuit between the first and second input nodes 11, 12 there may be a dead time between switching off the first electronic switch 31 and switching on the second electronic switch 32. When the power converter is in the first operating mode and the first electronic switch 31 switches off, the voltage U2 reverses its polarity. According to one example, when the second electronic switch 32 includes two unidirectionally blocking electronic switches, operating the second electronic switch 32 in the off-state includes (a) switching off the unidirectionally blocking switch that has its freewheeling element (such as the body diode of the MOSFET) reverse biased when the first electronic switch 31 is switched on, and (b) permanently switching on the electronic switch that has its freewheeling element forward biased when the first electronic switch 31 is switched on. When the converter stage input voltage U2 reverses its polarity, the freewheeling element of the unidirectionally blocking switch that is in the off-stage takes over the freewheeling current before the electronic switch 32 is operated in the on-state, that is, before both of the unidirectionally blocking switches are switched on.

According to one example, operating the power converter in the first operating mode includes regulating a voltage U1 across the inductor 25, wherein regulating the voltage U1 across the inductor 25 may include regulating an average U2_avg of the converter stage input voltage U2 by the switched-mode operation of the first and second electronic switches 31, 32. The converter stage input voltage U2 essentially equals the input voltage Uac when the first electronic switch 31 is in the on-state and essentially equals zero when the second electronic switch 32 is in the on-state. The average U2_avg of the converter stage input voltage U2 is essentially given by $$U2\_avg = d3 \cdot Uac \qquad (4)$$

wherein d3 is the buck mode duty-cycle of the switched-mode operation of the first electronic switch 31.

Referring to FIG. 8, the control circuit 4 is configured to control operation of the converter stage 2 by providing drive signals S26H, S26L received by the high-side switch 26H and the low-side switch 26L. Examples of the control circuit 4 are explained in detail herein further below.

Implementing the converter stage 2 with a totem pole topology is only an example. Any other kind of converter stage having a boost converter topology may be used as well. Further examples of converter stages 2 having a boost converter topology are illustrated in FIGS. 9A-9C and explained in the following.

Figure 9A:
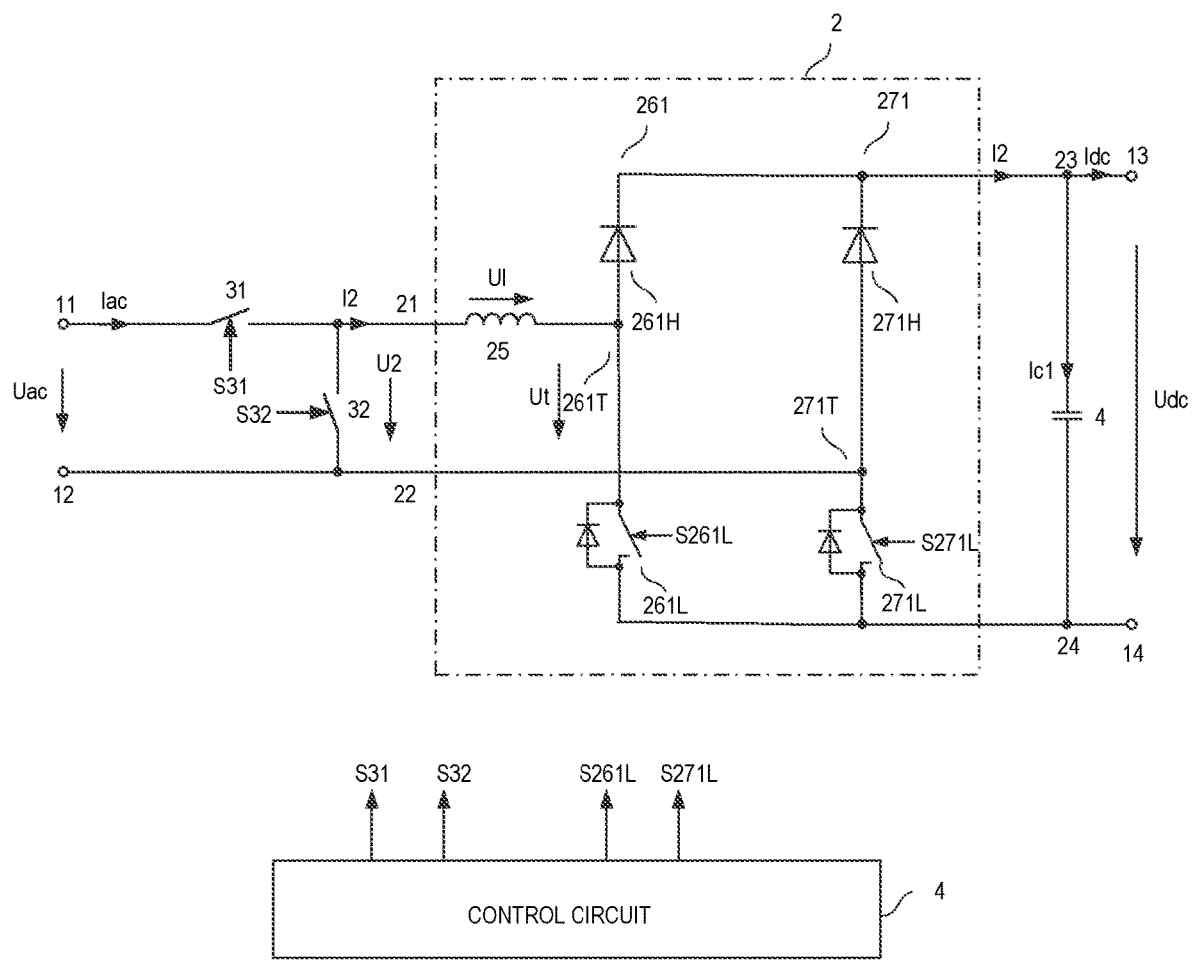
FIGS. 9A-9C illustrate further examples of converter stages having a boost converter topology.
Figure 9B:
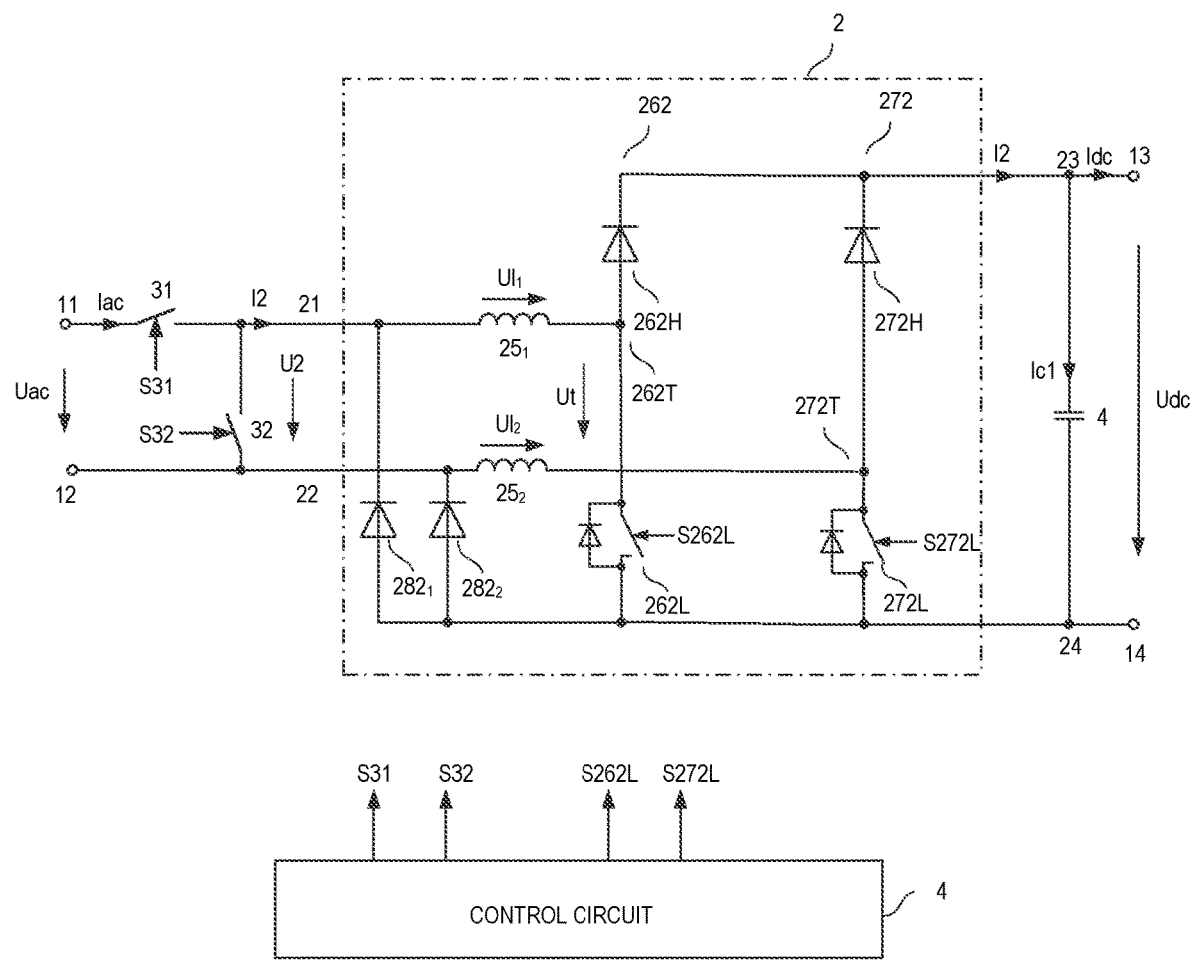
Figure 9C:
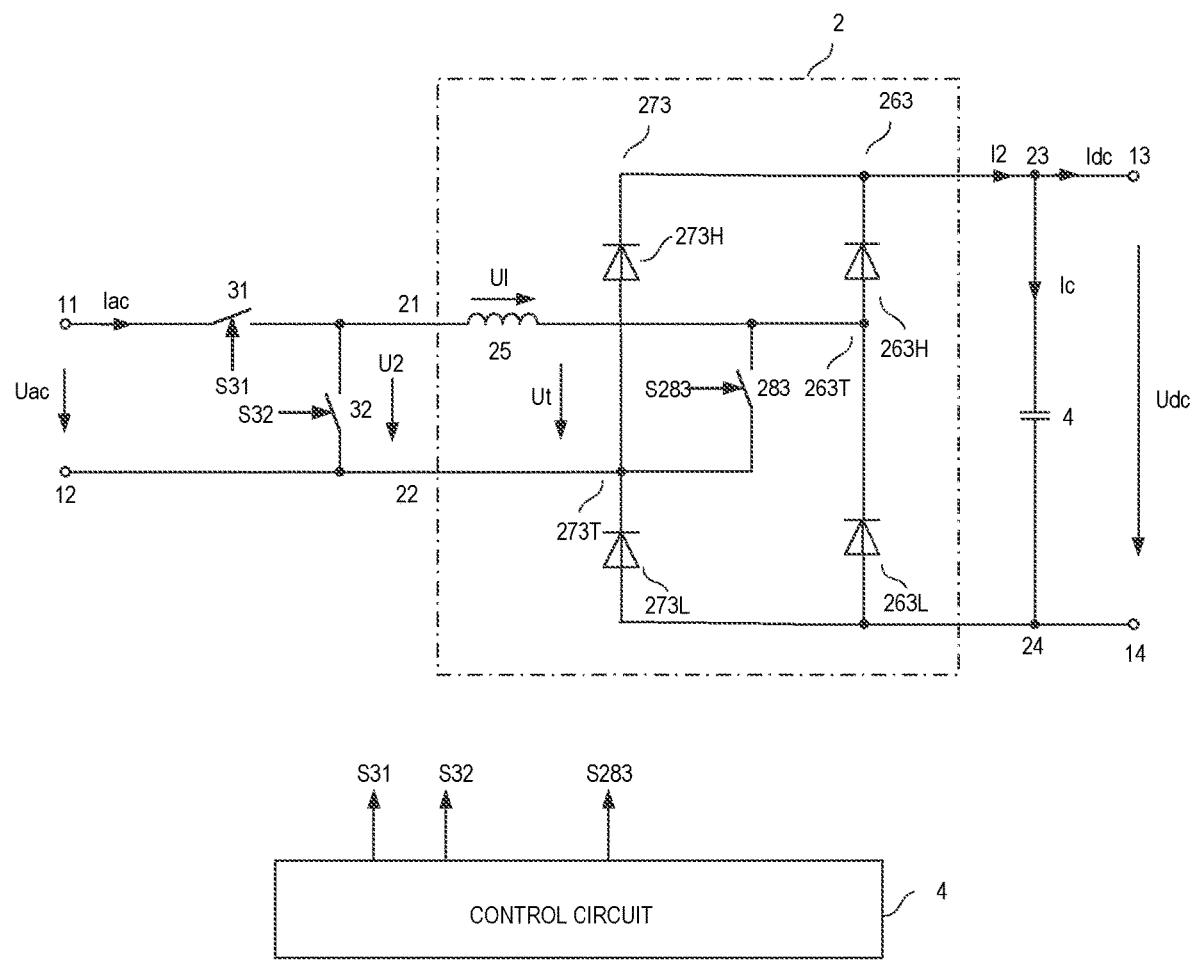

FIG. 9A shows a converter stage 2 which is a modification of the converter stage according to FIG. 8. The topology of the converter stage 2 according to FIG. 9A may be referred to as double boost PFC rectifier or, in short, double boost topology. The converter stage 2 according to FIG. 9A is different from the converter stage 2 according to FIG. 8 in that a first half-bridge 261, which has a tap 261T connected to the inductor 25, includes a low-side switch 261L and a high-side freewheeling element 261H (instead of a high-side switch and a low-side switch) and in that a second half-bridge 271, which has a tap 271T connected to the second input node 22, includes a low-side switch 271L and a high-side freewheeling element 271H (instead of a high-side freewheeling element and a low-side freewheeling element).

The high-side freewheeling element 261H of the first half-bridge 261 is connected between the tap 261T and the first output node 23 such that it conducts when the electrical potential at the tap 261T is higher than the electrical potential at the first output node 23. Furthermore, the high-side freewheeling element 271H of the second half-bridge 271 is connected between the tap 271T and the first output node 24 such that it conducts when the electrical potential at the tap 271T is higher than the electrical potential at the first output node 23.

Referring to FIG. 9A, low-side switch 261L, 271L of each of the first and second half-bridges 261, 271 may include a freewheeling element that is configured to conduct when a voltage across the respective switch 261L, 271L has a certain polarity. Referring to FIG. 9A, the low-side switch 261L of the first half-bridge 261 may be connected between the tap 261T and the second output node 24 such that the freewheeling element of the low-side switch 261L conducts when an electrical potential at the tap 261T is lower than the electrical potential at the second output node 24, and the low-side switch 271L of the second half-bridge 271 may be connected between the tap 271T and the second output node 24 such that the freewheeling element of the low-side switch 271L conducts when an electrical potential at the tap 271T is lower than the electrical potential at the second output node 24.

Referring to the above, in a converter stage 2 having a boost converter topology there is always a conducting path between the input 21, 22 and the output 23, 24 when the converter stage input voltage U2 is higher than the output voltage Udc. In the converter stage according to FIG. 9A, when the converter stage input voltage U2 is positive and has a magnitude that is higher than the voltage level of the output voltage Udc, an input current I2 received by the converter stage 2 may flow via the inductor 25, the high-side freewheeling element 261H of the first half-bridge 261, the output capacitor 15 and the freewheeling element of the low-side switch 271L of the second half-bridge 271. When the converter stage input voltage U2 is negative and has a magnitude that is higher than the voltage level of the output voltage Udc, the (negative) input current I2 may flow via the high-side freewheeling element 271H of the second half-bridge 271, the output capacitor 15, the freewheeling element of the low-side switch 261L of the first half-bridge 261 and the inductor 25.

FIG. 9B shows a modification of the converter stage 2 according to FIG. 9A. The topology of this converter stage may be referred to as double boost PFC rectifier with return freewheeling elements topology.

The converter stage 2 according to FIG. 9B includes a first inductor $25_1$ connected between the first input 21 and a tap 262T of a first half-bridge 262, and a second inductor $25_2$ connected between the second input 22 and a tap 272T of a second half-bridge 262. Like in the example shown in FIG. 9A each of the first and second half-bridges 262, 272 includes a high-side freewheeling element 262H, 272H and a low-side switch 262L, 272L including a respective freewheeling element. The high-side freewheeling elements 262H, 272H and the low-side switches 262L, 272L may be connected in the same way as in the example shown in FIG. 9A, so that the high-side freewheeling element 262H of the first half-bridge 262 conducts when the electrical potential at the tap 262T is higher than the electrical potential at the first output node 23; the high-side freewheeling element 272H of the second half-bridge 272 conducts when the electrical potential at the tap 272T is higher than the electrical potential at the first output node 23; the freewheeling element of the low-side switch 262L of the first half-bridge 262 conducts when the electrical potential at the tap 262T is lower than the electrical potential at the second output node 24; and the freewheeling element of the low-side switch 272L of the second half-bridge 272 conducts when the electrical potential at the tap 272T is lower than the electrical potential at the second output node 24.

Referring to FIG. 9B, the converter stage 2 further includes a first freewheeling element $282_1$ connected between the second output node 24 and the first input node 21, and a first freewheeling element $282_1$ connected between the second output node 24 and the second input node 22. The first and second freewheeling elements are connected between the second output node 24 and the respective input node 21, 22 such that the first freewheeling element $282_1$ conducts when the electrical potential at the second output node 24 is higher than the electrical potential at the first input node 21 and the second freewheeling element $282_2$ conducts when the electrical potential at the second output node 24 is higher than the electrical potential at the second input node 22. The freewheeling elements $282_1$, $282_2$ may be implemented as pn diodes (as shown) or Schottky diodes.

When the converter stage according to FIG. 9B is deactivated, the converter stage input voltage U2 is positive, and has a magnitude that is higher than the voltage level of the output voltage Udc, an input current I2 received by the converter stage 2 may flow via the first inductor $25_1$, the high-side freewheeling element 262H of the first half-bridge 262, the output capacitor 15 and the second freewheeling element $282_2$. When the converter stage input voltage U2 is negative, and has a magnitude that is higher than the voltage level of the output voltage Udc, an input current I2 received by the converter stage 2 may flow via the second inductor $25_2$, the high-side freewheeling element 272H of the second half-bridge 272, the output capacitor 15 and the first freewheeling element $282_1$.

FIG. 9C shows a converter stage 2 with a boost converter topology according to another example. The topology of the converter stage 2 shown in FIG. 9C may be referred to as H4-PFC rectifier topology or double boost PFC rectifier with bidirectional switch topology. In addition to the inductor 25 connected to the input 21, 22, the converter stage 2 includes two half-bridges that are each connected between the first output node 23 and the second output node 24. Each of these half-bridges 263, 273 includes two freewheeling elements 263H, 263L, 273H, 273L connected in series between the first and second output nodes 23, 24. The freewheeling elements of each of the first and second half-bridges 263, 273 are connected to one another at a respective tap 263T, 273T, wherein the tap 263T of the first half-bridge 263 is connected to the inductor 25 and the tap 273T of the second half-bridge 273 is connected to the input 21, 22. In the example shown in FIG. 9C, the inductor 25 is connected to the first input node 21 and the tap 273T of the second half-bridge 273 is connected to the second input node 22.

The half-bridges 263, 273 may be implemented with passive freewheeling elements such as, for example, pn diodes (as illustrated) or Schottky diodes (not illustrated). Additionally, a respective switch (not shown) may be connected in parallel with each of the freewheeling elements 263H, 263L, 273H, 273L, wherein the switch is driven by a respective drive circuit (also not shown) in such a way that the switch switches on when the freewheeling element is forward biased.

The freewheeling elements are connected between the first and second output nodes 23, 24 and the taps 263T, 273T such that a high-side freewheeling element 263H of the first half-bridge 263 conducts when the electrical potential at the tap 263T is higher than the electrical potential at the first output node 23; the low-side freewheeling element 263L of the first half-bridge 263 conducts when the electrical potential at the second output node 24 is higher than the electrical potential at the tap 263T; a high-side freewheeling element 273H of the first half-bridge 273 conducts when an electrical potential at the tap 273T is higher than the electrical potential at the first output node 23; and a low-side freewheeling element 273L of the second half-bridge 273 conducts when the electrical potential at the second output node 24 is higher than the electrical potential at the tap 273T.

In addition to the first and second half-bridges 263, 273, the converter stage 2 includes a switch 283 that is connected between the taps 263T, 273T and the that is controlled by the control circuit 4 through a respective drive signal S283. The switch 283 is a bidirectionally blocking switch, for example.

Implementing the converter stage with any of the topologies according to FIGS. 8 and 9A-9C is only an example. A converter stage 2 with any other type of boost converter topology may be used as well. As used herein, a "boost converter topology" is a circuit topology of the converter stage 2 that enables the converter stage 2, controlled by the control circuit 4, to generate the output voltage Udc such that a voltage level of the output voltage Udc is higher than the converter stage input voltage U2.

Figure 10:
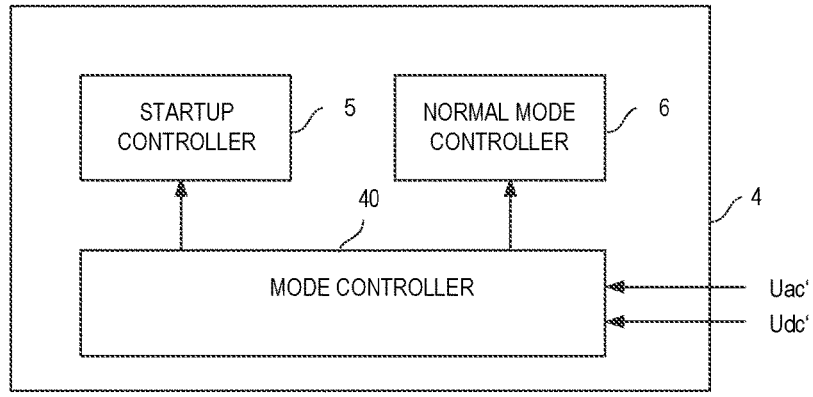
FIG. 10 shows a block diagram of a control circuit that includes a startup controller and a normal mode controller, according to one example.

FIG. 10 illustrates a block diagram of a control circuit 4 according to one example. In this example, the control circuit 4 includes a startup controller 5 that is configured to control operation of the power converter during the startup phase, and a normal mode controller 6 that is configured to control operation of the power converter after the startup phase, that is, after the output voltage Udc across the output capacitor 15 has reached the amplitude of the input voltage Uac.

According to one example, operating the power converter in the normal operating mode includes regulating the direct output voltage Udc such that a voltage level of the output voltage essentially equals an output voltage reference Udc* that is equal to or higher than an amplitude of the alternating input voltage Uac. According to one example, the input voltage Uac is a 230 Vrms voltage with an amplitude (peak voltage) of about 325V and the output voltage reference Udc* represents a voltage level selected from between 350V and 450V. The "normal operating state" of the power converter may include that the output capacitor 15 has been charged to a voltage level that is equal to or higher than the amplitude of the input voltage Uac.

Referring to FIG. 10, the control circuit 4 further includes a mode controller 40, wherein the mode controller 40 is configured to activate one of the startup controller 5 and the normal mode controller 6 dependent on the input voltage Uac and the output voltage Udc. More specifically, in the example shown in FIG. 10, the mode controller 40 is configured to activate one of the startup controller 5 and the normal mode controller 6 dependent on a measured input voltage Uac' and a measured output voltage Udc'. The measured input voltage Uac' represents the input voltage Uac and may be received by measuring the input voltage Uac in an arbitrary way. The measured output voltage Udc' represents the output voltage Udc and may be received by measuring the input voltage Udc in an arbitrary way. Based on the measured input voltage Uac' and the measured output voltage Udc', the mode controller 14 is configured to detect the operating state of the power converter.

According to one example, when the mode controller 40 activates the startup controller 5 it deactivates the converter stage 2 in the way explained above, and, when the mode controller 40 activates the normal mode controller 6 it permanently switches on the first switch 31 and permanently switches off the second switch 32.

It should be noted that FIG. 10 represents a possible functionality of the control circuit 4 rather than a specific implementation. The control circuit 4 may be implemented in various ways. According to one example, the control circuit 4 is implemented using dedicated circuitry. According to another example, the control circuit 4 includes a microcontroller and a memory that includes instructions (software) executed by the microcontroller.

Figure 11:
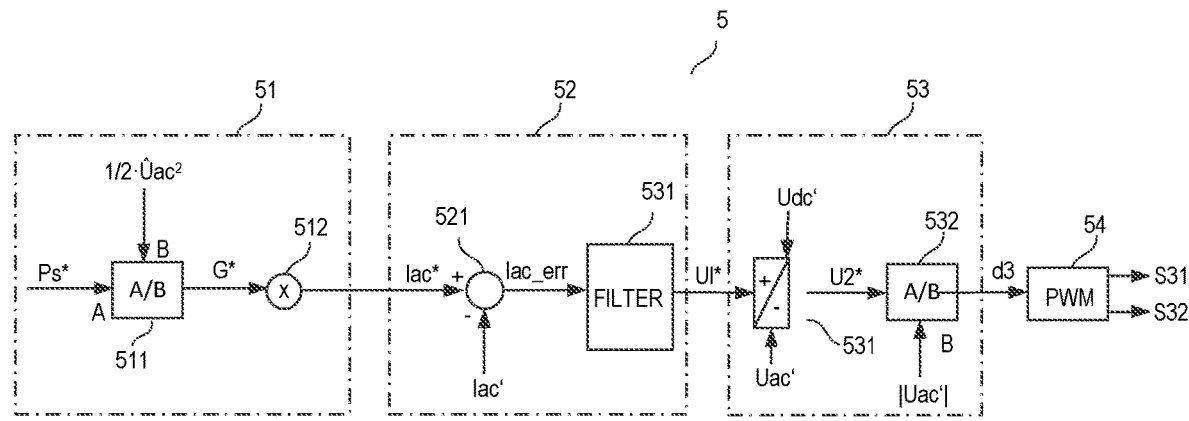
FIG. 11 illustrates one example of the startup controller.

FIG. 11 illustrates one example of the startup controller 5. The startup controller 5 shown in FIG. 11 is configured to regulate the input current Iac in the first operating mode such that an average of the input current Iac is essentially proportional of the input voltage Uac.

Referring to FIG. 11, the startup mode controller 5 includes a power controller 51 that is configured to output an input current reference Iac*, wherein the input current reference Iac* represents a desired average of the input current Iac. Based on the input current reference Iac* an input current controller 52 generates an inductor voltage reference U1*, which defines a desired average of the inductor voltage U1. Based on the inductor voltage reference U1*, an inductor voltage controller 53 generates the buck mode duty-cycle d3, wherein a PWM modulator 54 is configured to generate the drive signals S31, S32 of the first and second switches based on the buck mode duty-cycle d3.

Referring to FIG. 11, the input current controller 51 receives a startup power reference Ps*, which defines an average input power during the startup mode. A divider 511 divides the startup voltage reference Ps* by $0.5 \cdot \hat{U}ac^2$, which is 0.5 times the squared amplitude of the input voltage Uac. An output G* of the divider 511 represents a desired conductance of the power converter during the startup phase in the first operating mode. The input current reference Iac* equals the desired conductance G* multiplied with the measured input voltage Uac' and is output by a multiplier 512 that receives the desired conductance G* and the measured input voltage Uac'.

The input current controller 52 includes a subtractor 521 that subtracts a measured input current Iac' from the desired input current Iac* and outputs an input current error Iac_err. The measured input current Iac' represents the input current Iac and may be obtained by measuring the input current Iac in an arbitrary way. The input current error is filtered by a filter 531 that outputs the inductor current reference U1*. The filter 531 may have one of a proportional (P) characteristic, a proportional-integrative (PI) characteristic, a proportional-integrative-derivate (PID) characteristic, or the like.

The inductor voltage controller 53 receives the inductor current reference U1* and generates a converter stage input voltage reference U2* by adding the inductor voltage reference U1* to the measured output voltage Udc' during a positive halfwave of the input voltage Uac and by subtracting the inductor voltage reference U1* from the measured output voltage Udc' during a negative halfwave of the input voltage Uac. During the positive halfwave of the input voltage Uac, the inductor voltage reference U1* is positive in order to achieve a positive input current Iac and, during the negative halfwave of the input voltage Uac, the inductor voltage reference U1* is negative in order to achieve a negative input current Iac. The converter stage input voltage reference U2* represents the magnitude of a desired average of the converter stage input voltage U2, wherein the average converter stage input voltage U2avg is positive when the input voltage Uac is positive and negative when the input voltage Uac is negative. The converter stage input voltage U2, in combination with the output voltage Udc adjusts the inductor voltage U1, wherein the inductor U1 may be used to define the input current Iac.

An adder/subtractor 531 receives the inductor voltage reference U1*, the measured output voltage Udc', and the measured input voltage Uac' and is configured to add the inductor voltage reference U1* to the measured output voltage Udc' or to subtract the inductor voltage reference U1* from the measured output voltage Udc' dependent on the polarity of the measured input voltage Uac', that is, dependent on whether the input voltage Uac is in the positive or negative halfwave.

The buck mode duty-cycle d3 is output by a divider 532 that divides the converter stage input voltage reference U2* by the magnitude |Uac| of the measured input voltage Uac'. Referring to the above, the buck mode duty cycle d3 defines the on-time Ton1 of the first switch 31 relative to the duration T of the drive cycle in the switched-mode operation and 1-d3 defines the on-time of the second switch 32 relative to the duration of the drive cycle. Furthermore, the second switch 32 may be operated such that ist blocks when the first switch 31 is switched on and, during a dead time between switching off the first switch 31 and switching on the second switch 32 and during which a voltage across the second switch changes polarity, allows a freewheeling current to flow through the second switch 32, wherein the freewheeling current has the same current direction as the current after switching on the second switch 32.

Figure 12:
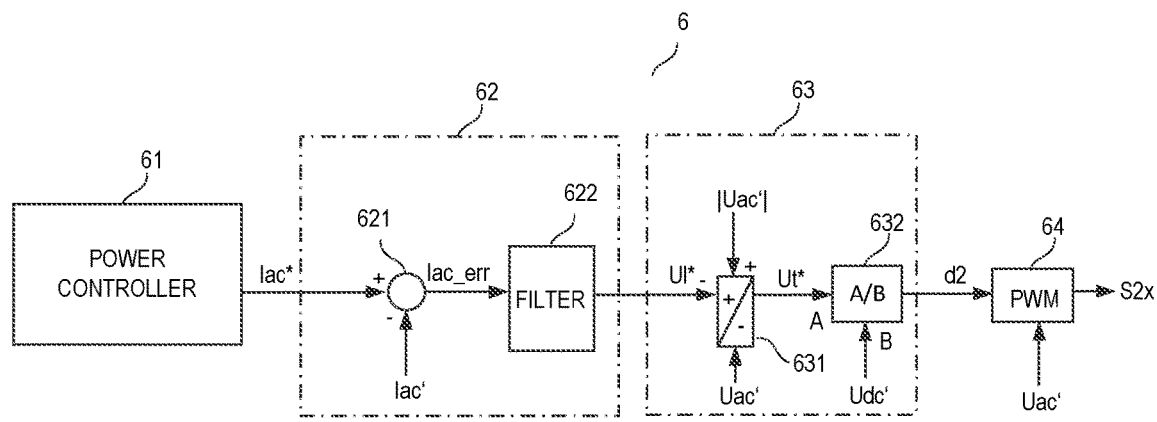
FIG. 12 illustrates one example of the normal mode controller.

FIG. 12 shows one example of the normal mode controller 6. Referring to FIG. 12, the normal mode controller 6 includes a power controller 61 that is configured to generate the input current reference Iac*, an input current controller 62 that is configured to generate the inductor voltage reference U1*, and an inductor voltage controller 63 that is configured to generate a duty-cycle d2 for controlling a switched-mode operation of the at least one switch in the converter stage 2 in the normal mode.

In the normal mode, as well as in the third operating mode explained above, the power converter operates in the boost mode. Thus, the duty-cycle d2 for controlling the switched-mode operation of the at least one switch in the converter stage 2 in the normal mode and the third operating mode may also be referred to as boost-mode duty cycle.

In the examples explained above, the at least one switch of the converter stage 2 includes the high-side switch 26H and the low-side switch 26L of the first half-bridge 26 according to FIG. 8; the low-side switches 261L, 271L of the first and second half-bridges 261, 271 according to FIG. 9A; the low-side switches 262L, 272L of the first and second half-bridges 262, 272 according to FIG. 9B; or switch 283 according to FIG. 9C. Reference character S2x in FIG. 12 denotes a drive signal for driving the at least one switch in the converter stage 2, wherein S2x either represents drive signals S26H, S26L according to FIG. 8; drive signals S261L, S271L according to FIG. 9A; drive signals S262L, S272L according to FIG. 9B; or drive signal S283 according to FIG. 9C, for example.

Figure 13:
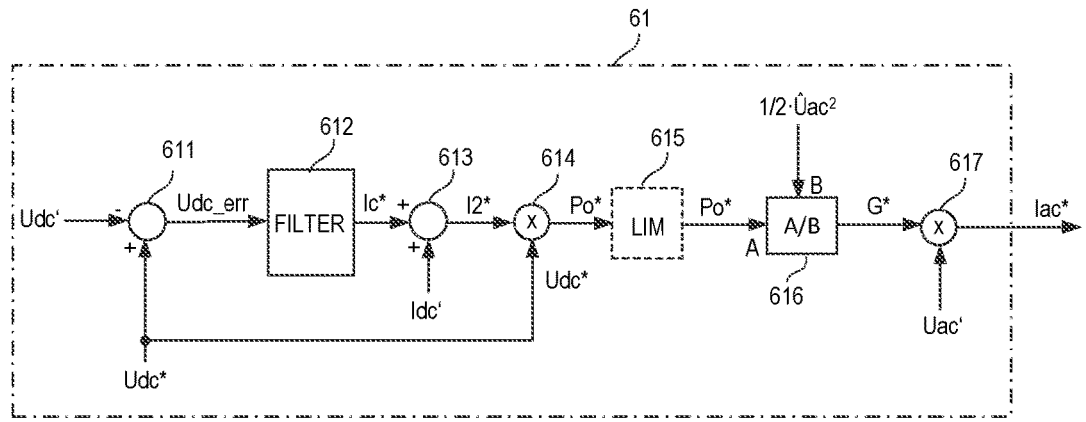
FIG. 13 illustrates one example of a power controller in the normal mode controller according to FIG. 12.

One example of the power controller 61, which may also be referred to as output voltage controller, is shown in FIG. 13 and is explained in detail herein further below.

The input current controller 62 is implemented in the same way as the input current controller 52 according to FIG. 11 and includes a subtractor 621 that subtracts the measured input current Iac' from the input current reference Iac* to provide an input current error Iac_err, which is filtered by a filter 622 in order to provide the inductor voltage reference U1*. The filter 622 may have any of the characteristics explained with reference to filter 531 herein above.

The inductor voltage controller 63 according to FIG. 12 is similar to the inductor voltage controller 53 according to FIG. 11 and includes an adder/subtractor 631, wherein the adder/subtractor 631 is configured to subtract the inductor voltage reference U1* from the magnitude |Uac'| of the measured input voltage Uac' or to add the inductor voltage reference U1* to the magnitude |Uac'| of the measured input voltage Uac' dependent on the polarity of the measured input voltage Uac'. More specifically, the adder/subtractor 631 is configured to subtract the inductor voltage reference U1* from the magnitude |Uac'| of the measured input voltage Uac' during the positive halfwave of the input voltage Uac and to add the inductor voltage reference U1* to the magnitude |Uac'| of the measured input voltage Uac' during the negative halfwave of the input voltage Uac. The inductor voltage reference U1* may be positive, negative, or zero dependent on whether it is desired for the average input current Iac_avg to increase, decrease, or remain constant.

The output signal of the adder/subtractor 631 is a switch node voltage reference Ut*, which is an average Ut_avg of a switch node voltage Ut. The switch node Ut is the voltage between the taps of the half-bridges in the converter stage 2, that is, the voltage between taps 26T, 27T in the example according to FIG. 8; between taps 261T, 271T in the example according to FIG. 9A; between taps 262T, 272T in the example according to FIG. 9B; and between taps 263T and 273T in the example according to FIG. 9C.

The switch node voltage Ut is adjusted by a switched-mode operation of the at least one switch in the converter stage 2. The average of the switched-mode voltage Ut is the average of the switch node voltage Ut over one drive cycle of the switched-mode operation of the at least one switch. In each of the converter stages 2 explained above, the switch node voltage Ut, dependent on the switching state of the at least one switch is either essentially zero or essentially equals the output voltage Udc. According to one example the average Ut_avg of the switch node voltage is given by $$Ut\_avg = d2 \cdot Udc \quad (5),$$

where d2 is the boost-mode duty-cycle and Udc is the voltage level of the output voltage Udc.

Likewise, the average of the input voltage U2 that is adjusted by the startup controller according to FIG. 11 is the average of the converter stage input voltage 2 over one drive period of the switched-mode operation of the first and second switches 31, 32 (see also equation (4)).

Referring to FIG. 12, a divider 632 divides the switch node voltage reference Ut* by the measured output voltage Udc' to generate the duty-cycle d2. A PWM modulator 64 receives the duty-cycle d2 and the measured input voltage Uac' and generates the at least one drive signal for driving the at least one switch in the converter stage 2.

The implementation of the PWM modulator 64 is dependent on the topology of the converter stage 2. In the converter stage 2 according to FIG. 8, for example, one of the two switches 26H, 26L of the half-bridge 26 is a control switch that controls the input current Iac in the normal mode, and the other one acts as a freewheeling element. When the input voltage Uac is positive, the low-side switch 26L is the control switch and the high-side switch 26L is the freewheeling element. When the input voltage Uac is negative, the high-side switch 26H is the control switch and the low-side switch 26L is the freewheeling switch.

In order to operate a converter stage 2 of the type according to FIG. 8, the PWM circuit 64 is configured to generate the drive signal of the control switch (that is, the low-side switch 26L when the input voltage Uac is positive and the high-side switch 26H when the input voltage Uac is negative), such that the duty-cycle of the control switch is given by 1−d2, where d2 is the boost-mode duty-cycle, and the duty-cycle of the freewheeling switch is given by d2, wherein the PWM circuit 64 dependent on the polarity of the measured input voltage Uac' decides which one of the two switches 26L, 26H is the control switch and which one is the freewheeling element. The control switch and the freewheeling switch are switched on alternatingly, wherein there may be a dead time between switching off the control switch and switching on the freewheeling switch.

In the converter stage 2 according to FIG. 9A, during the positive halfwave of the input voltage Uac, the low-side switch 261L of the first half-bridge 261 is the control switch and, during the negative halfwave of the input voltage Uac, the low-side switch 271L of the second half-bridge 271 is the control switch. In this converter stage 2, there is no freewheeling switch that is operated based on a duty-cycle that is given by d2. Instead, the other one of the two switches 261L, 271L is switched on permanently during the respective half-cycle. That is, during the positive halfwave of the input voltage Uac, the low-side switch 271L of the second half-bridge 271 is switched on permanently and, during the negative halfwave of the input voltage Uac, the low-side switch 261L of the first half-bridge 261 is switched on permanently.

In the converter stage 2 according to FIG. 9B, during the positive halfwave of the input voltage Uac, the low-side switch 262L of the first half-bridge 262 is the control switch and, during the negative halfwave of the input voltage Uac, the low-side switch 272L of the second half-bridge 272 is the control switch. Operation of that one of the two switches 262L, 272L that is the control switch in the respective halfwave is governed by the duty cycle d2. The other one of the two switches 262L, 272L is switched off by the PWM modulator 64 in the respective halfwave.

In each of the examples according to FIGS. 8, 9A and 9B, the duty cycle of the control switch is given by 1−d2 (one minus the boost-mode duty cycle d2), which may be referred to as complementary boost-mode duty cycle. Each time the respective control switch is switched on, the respective switch node voltage Ut is zero, and each time the respective control switch is switched off, the respective switch node voltage essentially equals the output voltage Udc. Thus, by controlling the control switch based on 1−d2 the average switch node voltage Ut_avg is in accordance with equation (5).

In the converter stage according to FIG. 9C, the only switch 283 in the converter stage is the control switch. In order to control the (control) switch 283 in the converter stage 2 according to FIG. 9C, the PWM circuit 64 is configured to adjust the duty-cycle of the single switch 283 based on 1−d2, that is, in the same way as the duty-cycle of the respective control switch in the other converter stages explained above.

FIG. 13 illustrates one example of the power controller 61 according to FIG. 12. In this example, the power controller 61 provides an output power reference Po*, wherein a divider 616, similar to the divider 511 in the power controller 51 according to FIG. 11, divides the output power reference Po* by $0.5 \cdot \hat{U}ac^2$ to obtain the desired conductance G*. A multiplier 617, similar to the multiplier 512 in the power controller 51 according to FIG. 11, multiplies the desired conductance G* by the measured output voltage Uac' in order to provide the input current reference Iac*.

Other than the startup power reference Ps* according to FIG. 11, the output reference Po* is not fixed but is dependent on an output voltage error Udc_err that represents a deviation of the output voltage Udc from the output voltage reference Udc*. The output voltage error Udc_err is generated by a subtractor 611 that subtracts the measured output voltage Udc' from the output voltage reference Udc*. A filter 612 outputs a capacitor current reference Ic*, which is the desired current that is to flow into the output capacitor 15 in order to adjust the output voltage Udc such that the voltage level of the output voltage equals the output voltage reference Udc*. Filter 612 may have any of the characteristics explained with reference to filter 531 according to FIG. 11.

An adder 613 adds the inductor current reference Ic* to the measured output current Idc', wherein an output signal I2* of the adder 613 represents a converter stage output current reference I2*, that is, the desired output current I2 of the converter stage 2. The measured output current Idc' is obtained by measuring the output current Idc of the power converter in an arbitrary way. In the normal operating mode, the output current Idc is not zero and is received by a load (not illustrated in the drawings). The current drawn by the load may vary, so that a regulation of the output voltage Udc is necessary.

Referring to FIG. 13, a multiplier 614 multiplies the converter stage output current reference I2* with the output voltage reference Udc* in order to provide the output power reference Po*. Optionally, a limiter 614 limits the output power reference Po* to a predefined value, in order to prevent an overload of the power converter, in particular in cases, in which the output voltage Udc significantly deviates from the output voltage reference Udc*.

Figure 14:
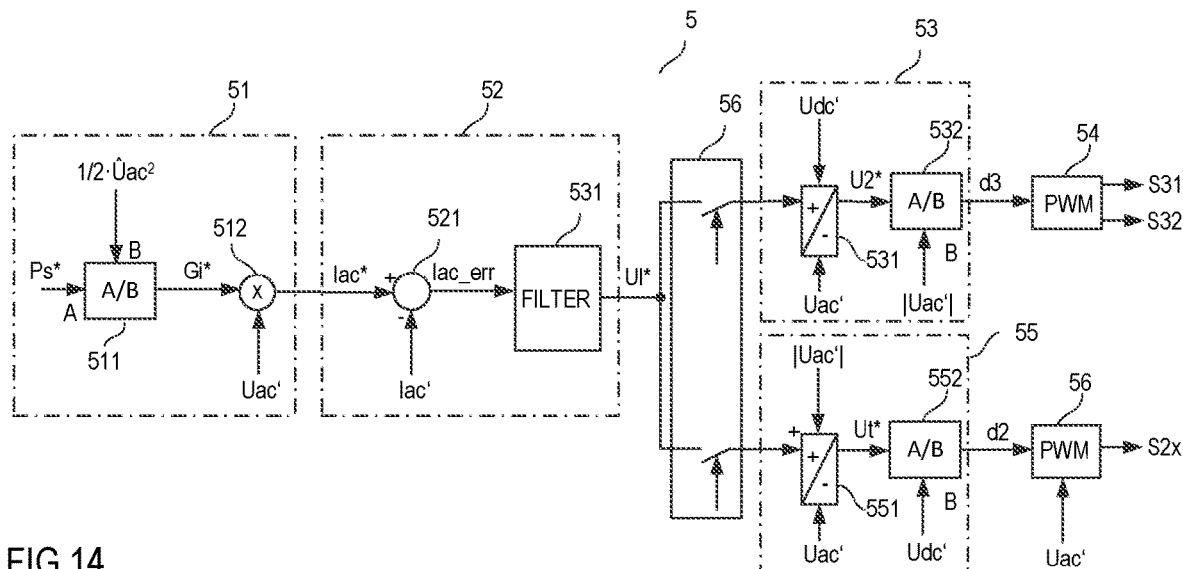
FIG. 14 illustrates a startup controller according to another example.

FIG. 14 shows a modification of the startup controller 5 according to FIG. 11. In the example shown in FIG. 14, the startup controller 5 includes two inductor voltage controllers, a first inductor voltage controller 53 that is identical with the inductor voltage controller 53 according to FIG. 11 and provides the buck mode duty-cycle d3 for the switched-mode operation of the first and second switches 31, 32. Furthermore, the startup controller 5 includes a second inductor voltage controller 55 that corresponds to the inductor voltage controller 63 according to FIG. 12 and provides the boost mode duty-cycle d2 for the switched-mode operation of the at least switch in the converter stage 2. The first and second inductor voltage controllers 53, 55 can be activated or deactivated by an activating circuit 56 that is controlled by the mode controller.

The startup controller 5 according to FIG. 14 is configured, in the startup phase to either operate the power converter in the first operating mode when the power converter is in the first operating state or in the third operating mode when the power converter is in the second operating state. The mode controller activates the first inductor voltage controller 53 when the power converter is in the first operating state in order to operate the power converter in the first operating mode. Furthermore, the mode controller activates the second inductor voltage controller 55 when the power converter is in the second operating state in order to operate the power converter in the third operating mode.

The second inductor voltage controller 55 is in accordance with the inductor voltage controller 63 according to FIG. 12 and includes an adder/subtractor 551 that subtracts the inductor voltage reference U1' from the magnitude of the measured input voltage Uac' during the positive halfwave of the input voltage Uac and adds the inductor voltage reference U1* to the magnitude of the measured input voltage Uac' during the negative halfwave of the input voltage Uac. A divider 552 divides the switch node voltage reference Ut* output by the adder 551 by the measured output voltage Udc' in order to output the buck mode duty-cycle d3.

Referring to FIG. 14, the PWM modulator 54 already explained with reference to FIG. 12 receives the buck mode duty-cycle d3 for controlling the switched-mode operation of the first and second switches 31, 32 and generates the drive signals S31, S32 for the first and second switches 31, 32 based on the buck mode duty-cycle d3.

Equivalently, a PWM modulator 56 receives the boost-mode duty-cycle d2 for controlling the switched-mode operating of the at least one switch in the converter stage 2 and generates the respective at least one drive signal S2x based on the boost-mode duty-cycle d2. The operating principle of the PWM modulator 56 is the same as the operating principle of the PWM modulator 64 according to FIG. 12.

Figure 15:
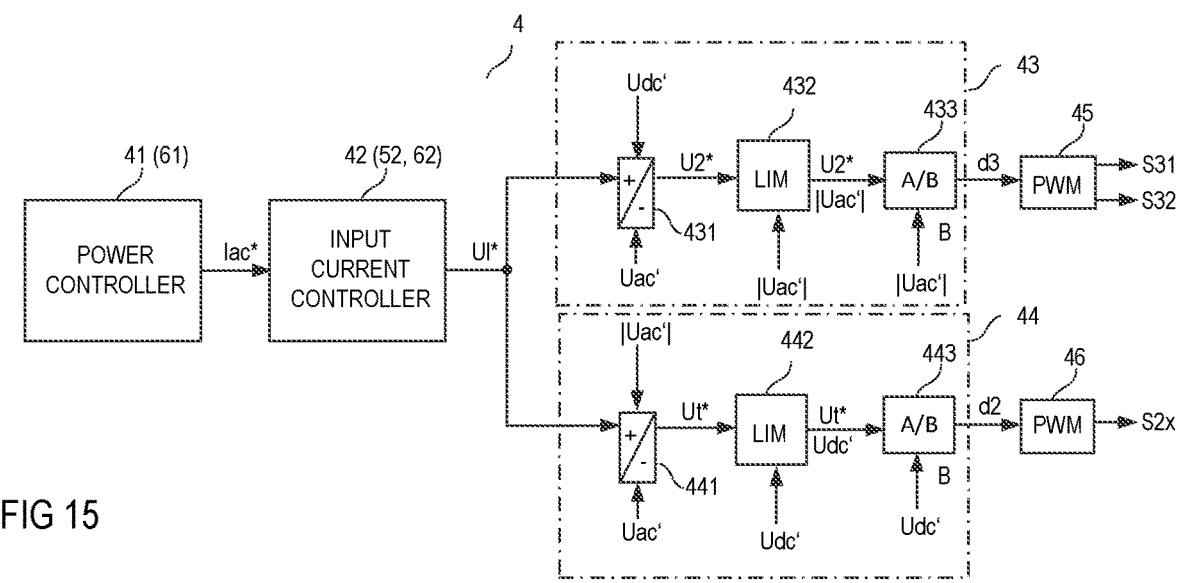
FIG. 15 illustrates another example of the control circuit.

FIG. 15 illustrates one example of a control circuit 4 that is configured to "automatically" operate the power converter in the first or third operating mode during the startup phase and in the normal operating mode after the startup phase. Referring to FIG. 4, this control circuit 4 includes a power controller 41, which is configured to output the input current reference Iac' and which may be implemented in the same way as the input current reference control 61 according to FIG. 12. Furthermore, the control circuit 4 includes an input current controller 42 that receives the input current reference Iac* and is configured to output the inductor voltage reference U1*. This input current controller 42 may be implemented in the same way as the input current controller 52 according to FIG. 11 or the input current controller 62 according to FIG. 12.

Furthermore, the control circuit 4 includes a first inductor voltage controller 43 that is configured to output the buck-mode duty-cycle d3 for controlling the switched-mode operation of the first and second switches 31, 32, and a second inductor voltage controller 44 that is configured to output the boost-mode duty-cycle de for controlling the switched-mode operation of the at least one switch in the converter stage 2. A first PWM modulator 45 outputs the drive signals S31, S32 for the first and second switches 31, 32 based on the buck mode duty-cycle d3. The operating principle of this PWM modulator 54 is the same as the operating principle of the PWM modulator 54 according to FIGS. 11 and 14. A further PWM modulator 46 outputs the at least one control signal S2x dependent on the boost-mode duty-cycle d2. The operating principle of this PWM modulator is the same as the operating principles of the PWM modulators 64 according to FIGS. 12 and 56 according to FIG. 14.

The first inductor voltage controller 43 is similar to the inductor voltage controller 53 according to FIG. 11 and includes an adder/subtractor 431 that subtracts the inductor voltage reference U1* from the measured output voltage Udc' or adds the inductor voltage reference U1* to the measured output voltage Udc' dependent on the measured input voltage Uac in the same way as adder/subtractor 531 according to FIG. 11 in order to output the converter stage input voltage reference U2*. A limiter 432 compares the converter stage input voltage reference U2* with the magnitude |Uac'| of the measured input voltage Uac' and either outputs the converter stage input voltage reference U2* or the magnitude |Uac'| of the measured input voltage. More specifically, limiter 432 outputs the converter stage input voltage reference U2* when the converter stage input voltage reference U2* is lower than the measured input voltage Uac', which is the case when the power converter is in the first operating state. When the converter stage input voltage reference U2* is higher than the magnitude of the measured input voltage Uac', which is when the power converter is in the second operating stage, or in the normal state (which is when the output capacitor 15 has been charged to such an extent that the voltage level of the output voltage Udc is equal to or higher than the amplitude of the input voltage Uac') limiter 432 outputs the magnitude |Uac'| of the measured input voltage Uac'.

Referring to FIG. 15, a divider 433 divides the output of the limiter 432 by the magnitude |Uac'| of the measured input voltage Uac' to output the buck-mode duty-cycle d3. When the output of the limiter 432 equals the converter stage input voltage reference U2*, PWM modulator 45 operates the first and second switches S31, S32 in the first operating mode dependent on the duty-cycle d3. When the output of the limiter 432 equals the magnitude |Uac'| of the measured input voltage reference Uac', the duty-cycle d3 is one (d3=1), which has the effect that the first switch 31 is permanently switched on and the second switch 32 is permanently switched off, so that the power converter is either in the third operating mode or in the normal operating mode.

Referring to the above, the controller according to FIG. 15 causes the power converter to operate in the first operating mode when the converter stage input voltage reference U2* is smaller than the magnitude |Uac'| of the measured input voltage Uac'. The first inductor voltage reference controller 34 is configured to adjust the input voltage reference U2* such that, when the average input voltage U2_avg essentially equals the input voltage reference U2*, the input current Iac is in accordance with the input current reference Iac*. By the switched-mode operation of the first and second switches 31, 32 the maximum average converter stage input voltage U2_avg that can be adjusted is given by the instantaneous voltage level of the input voltage Uac. The converter stage input voltage reference U2* rising above the magnitude |Uac'| of the measured input voltage Uac' indicates that the power consumption of the power converter cannot be satisfied by the switched mode operation of the first and second switches 31, 32, so that the power converter leaves the first operating mode and the first switch 31 is permanently switched on and the second switch 32 is permanently switched off. In this example, the power converter is in the first operating state when the converter stage input voltage reference U2* is smaller than the magnitude |Uac'| of the input voltage Uac', wherein the converter stage input voltage reference U2* is directly dependent on the measured input voltage Udc'.

Referring to FIG. 15, the second inductor voltage controller 44 includes an adder/subtractor 441 of the same type as adder/subtractor 631 according to FIG. 12 that subtracts the inductor voltage reference U1* from the magnitude of the measured input voltage Uac or adds the inductor voltage reference U1* to the magnitude of the measured input voltage Uac dependent on the polarity of the input voltage Uac in order to output the switch node voltage reference Ut*. A limiter 442 receives the switch node voltage reference Ut* and the measured output voltage Udc' and outputs the switch node voltage reference Ut* when the switch node voltage reference Ut* is lower than the measured input voltage Udc*, which is when the power converter is in the second operating mode or the normal mode, for example.

When the switch node voltage reference Ut* is higher than the measured output voltage Udc', the limiter 442 outputs the measured output voltage Udc'. A divider 443 divides the output of the limiter 442 by the measured output voltage Udc' in order to output the duty-cycle d2. The boost-mode duty-cycle d2, in the second operating mode or the normal mode, is given by the ratio between the switch node voltage reference Ut* and the measured output voltage Udc', which is the same as in the normal mode controller according to FIG. 12. When the output of the limiter 442 equals the measured output voltage Udc', the boost-mode duty-cycle d2 is one (d2=1), so that, in each of the examples explained above, the control switch is switched off permanently because the complementary boost-mode duty cycle is zero (1−d2=0).

In each of the boost converter stages 2 explained above, by operating the at least switch in a switched-mode, the (average) switch node voltage Ut cannot exceed the output voltage Udc', Thus, the second inductor voltage controller 44 deactivates the converter stage 2 (by setting the boost-mode duty cycle to zero) when the switch node voltage reference Ut* exceeds the voltage level of the measured output voltage Udc'. At the same time, or shortly thereafter, the converter stage input voltage reference U2* will drop below the magnitude |Uac'| of the input voltage Uac so that the power converter will operate in the first operating mode governed by the first inductor voltage controller 43.

In order to limit the input current during the startup phase, that power controller 41 includes a limiter 614 of the type explained with reference to FIG. 13. The power limit adjusted by this limiter 614 may correspond to the startup power reference Ps* according to FIG. 14.

Some of the aspects explained above are summarized in the following by way of numbered examples.

Example 1-A method comprising, in a power converter comprising an input, a converter stage, a first switch connected between the input and the converter stage, a second switch connected between input nodes of the converter stage, and an output capacitor connected between output nodes of the converter stage: detecting an operating state of the power converter; and operating the power converter in a first operating mode when the power converter is in a first operating state, wherein operating the power converter in the first operating mode comprises regulating an input current received at the input by a switched-mode operation of the first and second electronic switches.

Example 2—The method of example 1, wherein each of the first electronic switch and the second electronic switch is a bidirectionally blocking switch.

Example 3—The method of example 2, wherein the bidirectionally blocking switch includes a first MOSFET and a second MOSFET connected in series such that body diodes of the first and second MOSFETs are connected in anti-series.

Example 4—The method of example 2, wherein the bidirectionally blocking switch includes a HEMT with two gate electrodes.

Example 5—The method of any one of examples 1 to 4, wherein detecting the operating state includes detecting an input voltage received at the input and detecting an output voltage across the output capacitor, and wherein the power converter is in the first operating state when a magnitude of the input voltage is higher than a voltage level of the output voltage.

Example 6—The method of any one of examples 1 to 5, wherein operating the power converter in the first operating mode further comprises deactivating the converter stage.

Example 7—The method of any one of examples 1 to 6, further comprising: operating the power converter in a second operating mode when the power converter is in a second operating state, wherein operating the power converter in the second operating mode comprises: deactivating the converter stage; operating the first switch in an off-state; and operating the second switch in an on-state.

Example 8—The method of any one of examples 1 to 6, further comprising: operating the power converter in a third operating mode when the power converter is in a second operating state, wherein operating the power converter in the second operating mode comprises: switching on the first electronic switch; switching off the second electronic switch; and activating the converter stage.

Example 9—The method of example 7 or 8, wherein the power converter is in the second operating state when the magnitude of the input voltage is lower than a voltage level of the output voltage and when the output voltage is lower than a first threshold.

Example 10—The method of example 9, wherein the first threshold is equal to or higher than an amplitude of the input voltage.

Example 11—The method of example 9 or 10, further comprising: operating the power converter in a normal operating mode when the power converter is in a normal operating state different from the second operating state.

Example 12—The method of example 11, wherein the power converter is in the normal operating state when the output voltage is higher than the first threshold.

Example 13. The method of any one of examples 8 to 12, wherein activating the converter stage comprises regulating the input current by a switched-mode operation of at least one switch in the converter stage.

Example 14—The power converter of example 1, wherein regulating the input current includes generating a converter stage input voltage reference, wherein the converter stage input voltage reference represents a desired average converter stage input voltage to be adjusted by the switched-mode operation of the first and second electronic switches, and wherein the power converter is in the first operating state when the converter stage input voltage reference is smaller than the magnitude of the input voltage.

Example 15—The method of any one of the preceding examples, wherein the converter stage comprises a topology that is selected from one of the following topologies: dual boost Totem pole PFC rectifier topology; H4 PFC rectifier; dual boost PFC rectifier; and dual boost PFC rectifier with return freewheeling elements.

Example 16—A control circuit configured to: detect an operating state of a power converter; and operate the power converter in a first operating mode when the power converter is in a first operating state, wherein the power converter comprises an input, a converter stage, a first switch connected between the input and the converter stage, a second switch connected between input nodes of the converter stage, and an output capacitor connected between output nodes of the converter stage, and wherein operating the power converter in the first operating mode comprises regulating an input current received at the input by a switched-mode operation of the first and second electronic switches.

The invention claimed is:

1. In a power converter comprising a first power converter input node, a second power converter input node, a converter stage, a first electronic switch connected between the first power converter input node and a first converter stage input node of the converter stage, a second electronic switch connected between the first converter stage input node and a second converter stage input node of the converter stage, and an output capacitor connected between a first output node and a second output node of the converter stage, a method comprising:
via a controller, in response to detecting operation of the power converter in a first operational state, implementing a first mode of regulating an input current supplied through the first electronic switch to the first converter stage input node via a switched-mode operation of the first electronic switch and the second electronic switch; wherein the switched-mode operation of the first electronic switch and the second electronic switch comprises alternatingly switching ON and switching OFF the first electronic switch and the second electronic switch;
the method further comprising: via the controller, implementing a second mode of regulating the input current supplied through the first switch via activation of the converter stage, the first switch activated to an ON-state and the second switch deactivated to an OFF-state during the second mode.

2. The method of claim 1, wherein each of the first electronic switch and the second electronic switch is a bidirectionally current blocking switch.

3. The method of claim 1, wherein detecting the operation of the power converter includes detecting an input voltage received at the first power converter input node and detecting an output voltage across the output capacitor, and wherein the power converter is detected as being in the first operational state based on detecting a condition in which a magnitude of the input voltage is greater than a voltage level of the output voltage.

4. The method of claim 1 further comprising: deactivating the converter stage during the switched-mode operation of the first electronic switch and the second electronic switch.

5. The method of claim 1 further comprising:
in response to detecting operation of the power converter in a second operational state:
i) deactivating the converter stage;
ii) operating the first electronic switch in an off-state; and
iii) operating the second electronic switch in an on-state.

6. The method of claim 1 further comprising:
implementing the second mode in response to detecting that the power converter is operated in a second operational state.

7. The method of claim 5, wherein the power converter is detected as being in the second operational state during a condition in which: i) a magnitude of an input voltage received across the first power converter input node and the second power converter input node is detected as being lower than a voltage level of an output voltage across the first output node and the second output node of the converter stage, and ii) the output voltage is detected as being lower than a first threshold.

8. The method of claim 7, wherein the first threshold is greater than an amplitude of the input voltage.

9. The method of claim 7 further comprising:
operating the power converter in a normal operational mode in response to detecting that the power converter is in a normal operating state different from the second operational state.

10. The method of claim 9, wherein the power converter is in the normal operating state when the output voltage is greater than the first threshold.

11. The method of claim 1, wherein regulating the input current includes generating a converter stage input voltage reference;
wherein the converter stage input voltage reference represents a desired average converter stage input voltage to be adjusted by the switched-mode operation of the first electronic switch and the second electronic switch; and wherein the power converter is detected as being in the first operational state during a condition in which the converter stage input voltage reference is less than a magnitude of the input voltage.

12. The method of claim 1, wherein the converter stage comprises a topology that is selected from one of the following topologies: dual boost Totem pole PFC rectifier topology; H4 PFC rectifier; dual boost PFC rectifier; and dual boost PFC rectifier with return freewheeling elements.

13. The apparatus as claim 1, wherein activation of the converter stage in the second mode includes operating the converter stage in a PFC (Power Factor Correction) mode in which a magnitude of the input current is dependent on a voltage level of an input voltage supplying the input current.

14. An apparatus comprising:
a converter stage;
a controller operative to, in response to detecting the converter stage operating in a first operational state, control operation of a first switch and a second switch in accordance with a switched-mode operation of alternatingly switching ON and switching OFF the first switch and the second switch;
wherein the first switch is disposed between an input node of the apparatus and a first node of the converter stage; and
wherein the second switch is disposed between the first node of the converter stage and a second node of the converter stage, the input node of the apparatus operative to supply an input current to the first switch, a first output node of the apparatus operative to output an output voltage produced by the converter stage;
wherein the controller is further operative to:
in response to detecting the converter stage operating in a second operational state;
i) deactivate the converter stage;
ii) control the first switch to be in an off-state; and
iii) control the second switch to be in an on-state.

15. The apparatus as in claim 14, wherein the controller is further operative to:
in accordance with the switched-mode operation of alternatingly switching ON and switching OFF the first switch and the second switch:
i) in a first state of the switched-mode operation, control the first switch to an ON-state and the second switch to an OFF-state; and
ii) in a second state of the switched-mode operation, control the first to an OFF-state and the second switch to an ON-state.

16. The apparatus as in claim 14, wherein the first switch is disposed in series with the second switch.

17. The apparatus as in claim 14, wherein the second operational state is a detected condition in which: i) a magnitude of an input voltage received across the first node and the second node is detected as being lower than a voltage level of the output voltage.

18. The apparatus as in claim 14 further comprising:
wherein the converter stage includes an inductor; and
wherein the switched-mode operation of alternatingly switching ON and switching OFF the first switch and the second switch is operative to control flow of the input current through the inductor.

19. The apparatus as in claim 18, wherein the input current is an AC input current.

20. The apparatus as in claim 18, wherein the inductor is connected between the first node of the converter stage and a third node of the converter stage; and
wherein the converter stage includes a first circuit component, the first circuit component connected between the third node and the first output node of the converter stage.

21. The apparatus as in claim 20, wherein the converter stage includes a second circuit component connected between the third node and a second output node of the converter stage.

22. The apparatus as in claim 21, wherein the first circuit component is a third switch controlled by the controller; and
wherein the second circuit component is a fourth switch controlled by the controller.

23. The apparatus as in claim 21, wherein the first circuit component is a first diode; and wherein the second circuit component is a second diode.

24. The apparatus as in claim 14, wherein the converter stage includes a first inductor and a second inductor; and
wherein activation of the second switch is operative to electrically connect the first inductor and the second inductor in series.

25. The apparatus as in claim 24, wherein activation of the first switch is operative to convey input current to the first inductor.

* * * * *